United States Patent
Chau et al.

(10) Patent No.: US 9,841,285 B2
(45) Date of Patent: Dec. 12, 2017

(54) GENERATION OF LINK NODE ROUTING GRAPH USING A STRAIGHT SKELETON ALGORITHM

(71) Applicant: HERE Global B.V., Eindhoven (NL)

(72) Inventors: Karen Chau, Chicago, IL (US); Jim Leflar, Chicago, IL (US); John Minchuk, Chicago, IL (US); Kim Moss, Chicago, IL (US); Rich Valde, Chicago, IL (US); Mike Wrenn, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 69 days.

(21) Appl. No.: 14/979,170

(22) Filed: Dec. 22, 2015

(65) Prior Publication Data

US 2017/0176193 A1    Jun. 22, 2017

(51) Int. Cl.
*G01C 21/00* (2006.01)
*G01C 21/34* (2006.01)
*G01C 21/36* (2006.01)

(52) U.S. Cl.
CPC ..... *G01C 21/3407* (2013.01); *G01C 21/3605* (2013.01); *G01C 21/3655* (2013.01)

(58) Field of Classification Search
CPC ...... G01C 21/00; G01C 21/3667; G06K 9/00; G06T 11/206; G06F 19/00; G06F 17/5077; G06F 17/30244
USPC ... 701/465, 802, 409, 410, 433, 25, 28, 737; 382/100, 218, 113, 153; 340/944, 990, 340/995.19
See application file for complete search history.

(56) References Cited

U.S. PATENT DOCUMENTS

| | | | | |
|---|---|---|---|---|
| 6,119,065 | A * | 9/2000 | Shimada | G01C 21/20 340/944 |
| 6,349,261 | B1 * | 2/2002 | Ohnishi | G01C 21/3423 340/995.19 |
| 6,728,636 | B2 * | 4/2004 | Kokojima | G01C 21/20 340/990 |

OTHER PUBLICATIONS

International Journal of Geographical Information Science, Generation of Navigation Graphs for Indoor Space, Jul. 24, 2015, Taylor & Francis.

* cited by examiner

*Primary Examiner* — Dalena Tran
(74) *Attorney, Agent, or Firm* — Alston & Bird LLP

(57) ABSTRACT

A processor identifies a navigable space. The processor generates a polygon from the navigable space. The processor calculates skeleton lines from the polygon using a topological algorithm. The processor removes a subset of skeleton lines leaving one or more center segments. The processor generates a routing graph from the center segments.

20 Claims, 21 Drawing Sheets

US 9,841,285 B2

GENERATION OF LINK NODE ROUTING GRAPH USING A STRAIGHT SKELETON ALGORITHM

FIELD

The following disclosure relates to mapping and navigation devices or services.

BACKGROUND

Navigation systems are used by people and vehicles for routing and directions in order to correctly and efficiently travel between two locations. Navigation systems may use link and node routing graphs for storing data and calculating routes. For a roadway network, a link and node routing graph is straightforward. A roadway network may be represented as a link node system with roads represented as links and endpoints represented as nodes. To generate a routing graph, a system simply includes those road links that are considered navigable.

Computing a routing graph for an open space, however, is not as trivial. There may not be natural nodes or links such as in a road network. An open space may not have a set pathway or track to follow. Routes may be created using a mesh that fills the open space. One implementation uses a triangulation algorithm (e.g., Delaunay triangulation) to create a mesh that fills the space with triangles from a set of calculated points. Using a mesh to generate links and nodes, however, generates jagged or confusing segments. Other methods may use line of sight between a starting point and a destination. This technique creates un-natural and jagged pathways that may be confusing to users. Users require a system that is not only direct as possible, but also capable of being understood; a navigational system which generates natural efficient turn-by-turn guidance for open spaces.

SUMMARY

A method comprising identifying, by a processor, a pedestrian space. The processor generates a polygon from the pedestrian space. The processor calculated skeleton lines for the polygon. The processor removes a subset of skeleton lines that intersect with the polygon leaving one or more center segments. The processor generates a link node routing graph including the one or more center segments for the pedestrian space.

An apparatus comprising at least one processor and one memory. The memory is configured to store a computer program code. The computer program code is configured to cause the apparatus to identify a navigable space. The apparatus generates a polygon from the navigable space. The apparatus calculates straight skeleton lines for the polygon. The apparatus removes a subset of straight skeleton lines. The apparatus identifies an intermediary polygon a first offset distance from the polygon, wherein the intermediary polygon includes intermediary segments. The apparatus identifies one or more destination points in the navigation space. The apparatus generates one or more destination segments from one or more center segments connected to the one or more destination points. The apparatus generates one or more perimeter segments from the intermediary polygon to the one or more destination points. The apparatus generates a link node routing graph for the navigation space including the one or more center segments, the one or more intermediary segments, the one or more destination segments, and the one or more perimeter segments.

An apparatus comprising a processor and a memory, the apparatus configured to identify a starting location and a destination. The apparatus transmits a request for a route from the starting location to the destination. The apparatus receives the route, wherein the route is generated from a link node routing graph including one or more center segments and one or more destination segments. The one or more center segments and one or more destination segments are calculating using a straight skeleton algorithm on a polygon with a one or more destinations.

BRIEF DESCRIPTION OF THE DRAWINGS

Exemplary embodiments of the present invention are described herein with reference to the following drawings.

DETAILED DESCRIPTION

Figure 1E:
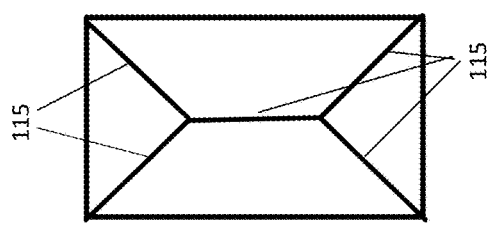
FIGS. 1A, 1B, 1C, 1D, and 1E illustrate examples of straight skeleton generation.

The following embodiments relate to a topological algorithm to generate a link node graph for a navigable space. The topological algorithm may be a straight skeleton algorithm. A skeleton algorithm may be used to generate lines inside an area, which may be equidistant to the boundaries of the area such as a topological skeleton or medial axis. A straight skeleton algorithm generates a straight line inside an area. The link node graph may be a graph comprising of two or more nodes and at least one link (or segment). In a link node graph, each link has a node at each endpoint. A routing graph represents the paths from starting nodes to destination nodes.

To generate a link node routing graph, a polygon is first generated from a navigable space. The navigable space may be a space that is navigable by a person, a machine, or another mode of transportation. The navigable space may include at least a starting point and an end point. A straight skeleton algorithm is applied to the polygon to generate straight skeleton lines. Certain lines are removed in order to identify center segments. Destination points are identified and destination segments are generated from the center segments to the destination points. A link node routing graph is generated from the destinations points, the center segments, and the destination segments.

The link node routing graph generated provides for routes that may be more practical and natural than routes generated from a mesh or based on line of sight. The routes may mimic a person walking efficiently to a destination while still following the norms of a pedestrian area, i.e. not hugging walls or changing direction erratically. The routes, due to fewer jagged or erratic turns, may be more practical to use for directions. Link node routing graphs may be used for mapping or navigation space. For a road network, because the roads are already represented as a link node system with roads represented as links and endpoints represented as nodes, the routing graph includes those road links that are considered navigable. In maps without predefined paths, the link nodes are not naturally created as part of the map building process. Programmatically creating these routing graphs using a straight skeleton algorithm provides these features in maps quickly and efficiently. With the links and nodes provided by the straight skeleton algorithm, the resulting routing graph offers both efficient and useable directions. Routes follow straightforward pathways without unnecessary turns or adjustments.

A straight skeleton algorithm is a process for generating one or more straight lines in the interior of a polygon to generate a skeleton for the polygon. To generate a straight skeleton for polygon, the edges of the polygon are translated inwards using an offset value. The translation of the edges may be referred to as a wavefront as each edge is translated lockstep with the other edges. The straight skeleton nodes are eventually created by events between the edges as the edges move inwards.

Figure 1D:
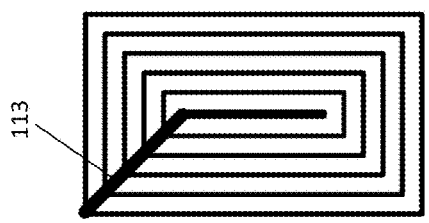
Figure 1C:
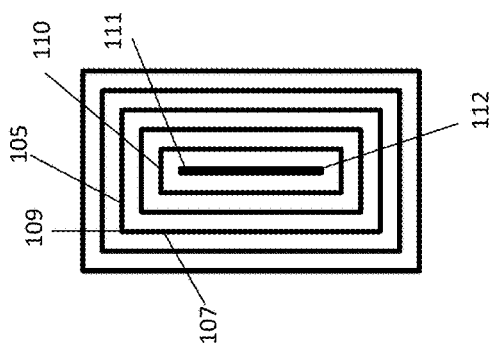
Figure 1B:
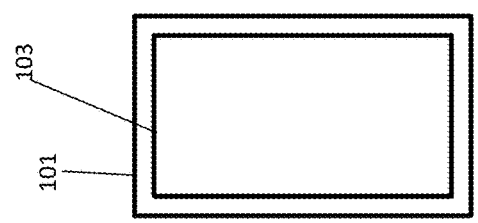
Figure 1A:
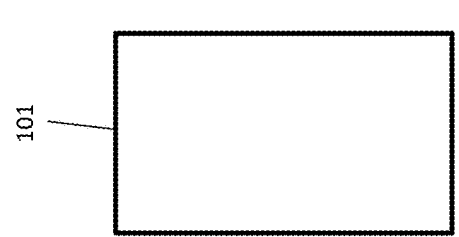

FIGS. 1A-1E illustrate how the straight skeleton algorithm may be applied to a polygon 101. In FIG. 1B, the polygon 101 is translated by offsetting (shrinking) the polygon 101 which generates polygon 103. Polygon 103 is then translated to a smaller polygon. This process continues until an edge event occurs. An edge event occurs when an edge shrinks to zero, making the edge's neighboring edges adjacent. A split event occurs when a vertex runs into an edge and splits the edge, thus splitting the polygon into two polygons. Additional events such as vertex-events or multi-split events are possible for certain configurations. FIG. 1C illustrates an edge event at point 111 where the edge 110 has shrunk to zero. A node is generated at point 111. The same event occurs in the lower half of the polygon at point 112. Points 111 and 112 are the two nodes for the straight skeleton of polygon 101.

FIG. 1C further depicts two edges 105 and 107. The edges meet at the polygon vertex 109. FIG. 1D illustrates an arc (angular bisector) 113 drawn between each of the points where edges meet such as vertex 109. FIG. 1E illustrates the arcs 115 that make up the straight skeleton of the polygon 101.

A straight skeleton S(P) of the polygon P may be defined as the union of the pieces of arcs (such as 113) traced out by polygon vertices (such as vertex 109) during the shrinking process. Arcs may be referred to as segments, and endpoints of the arcs, which are not vertices of P are called nodes of S(P). The S(P) for a polygon P with N vertices has N−2 Nodes and 2*N−3 segments. As show by FIG. 1E, the straight skeleton for polygon 101 has five segments (115) and two nodes (111 and 112).

Figure 2:
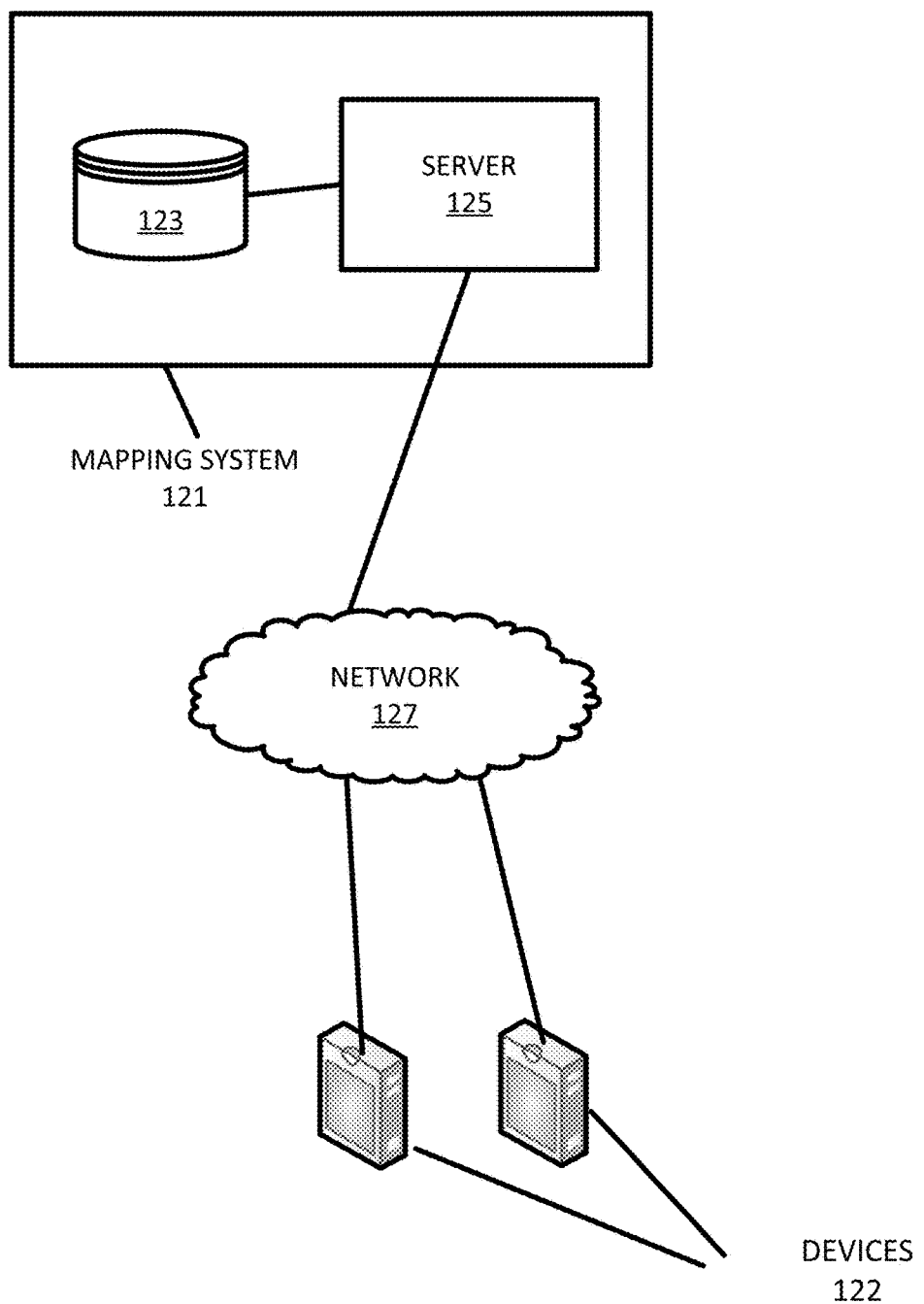
FIG. 2 illustrates an example system for generating a link node routing graph for a navigable space.

FIG. 2 illustrates an example system for generating a link node routing graph for a navigable space. The system comprises or more devices 122, a network 127, and a mapping system 121. The mapping system 121 may include a database 123 and a server 125. The mapping system 121 may be comprised of multiple servers, workstations, databases, and other machines connected together and maintained by a map developer. The mapping system 121 may be configured to generate routes or paths between two points (nodes) on a stored map. The mapping system 121 may also be configured to provide up to date information and maps to external map databases or mapping applications. The mapping system 121 may be configured to encode or decode map or geographic data. The mapping system 121 may be configured to generate links and nodes from a navigable space using a topological algorithm. The links and nodes generated are stored by the mapping system 121 in the map database 123.

The map database 123 (also referred to as a database or a geographic database) may include geographic data used for traffic and/or navigation-related applications. The geographic data may include data representing a navigable space such as a pedestrian space, a road network or other system including link data and node data. Other formats than links and nodes may be used for the geographic data. The geographic data may include structured cartographic data.

The map database 123 may include node data records or link data records, Point of Interest (POI) data records, and other data records. More, fewer or different data records can be provided. In one embodiment, the other data records include cartographic data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via positional data or Global Positioning System (GPS) data associations (such as using known or future map matching or geo-coding techniques).

The database 123 may be maintained by a content provider (e.g., a map developer). By way of example, the map developer may collect geographic data to generate and enhance the geographic database 123. There may be different ways used by the map developer to collect data. These ways may include obtaining data from other sources, such as businesses, municipalities or respective geographic authorities. In addition, the map developer may employ field personnel to travel throughout the geographic region to observe features and/or record information about them, for example. Also, remote sensing, such as aerial or satellite photography, may be used. The database 123 is connected to the server 125.

The server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide recent or current conditions for the paths or routes using the recently or real time collected data. Historical and recent data may also be blended to produce descriptions of a navigable space.

The server 125 is connected to the network 127. The server 125 may receive or transmit descriptions of navigable spaces through the network 127. The server 125 may also transmit paths, routes, or link node routing graphs through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The one or more devices 122 may include personal navigation devices or probe devices. The server 125 may communicate with the personal navigation devices to transmit requested paths or routes. The server 125 may also receive data from one or more devices 122 that may be used in the link node generation or for updating or generating attributes for the links and nodes.

Figure 3:
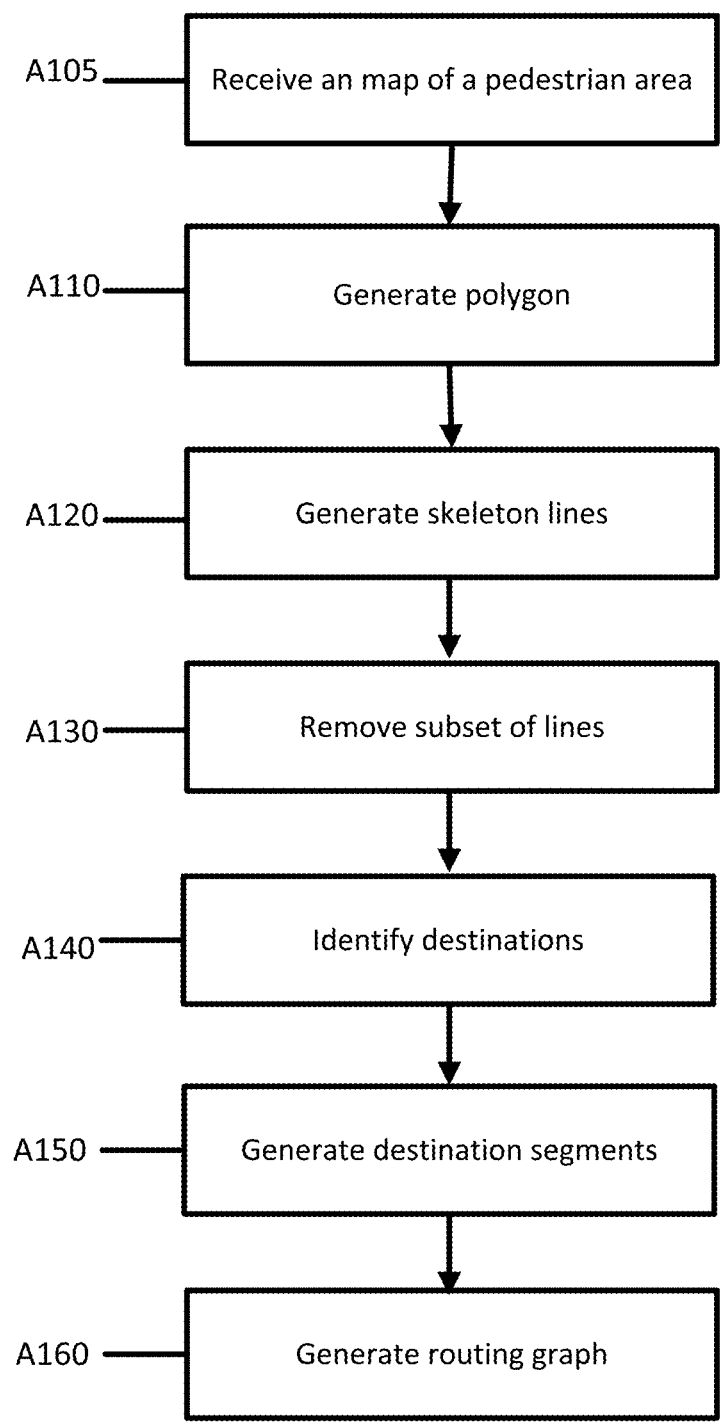
FIG. 3 illustrates an example flow chart for generating a link node routing graph for a navigable space.

FIG. 3 illustrates an example flow chart of a method for generating a link node routing graph for a pedestrian space. As presented in the following sections, the acts may be performed using any combination of the components indicated in FIG. 2, FIG. 12, or FIG. 18. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act 105, the server 125 receives a map or layout of a pedestrian space. The map or layout of the pedestrian space may be previously stored in the map database 123 or received through the network 127. The map or layout may be generated by a map developer. A pedestrian space may be any space that is navigable by a walking person. In certain embodiments, a routing graph may be generated for any navigable space. A navigable space may be any space that is capable of being traversed by any mode of transportation. Modes of transportation may include walking, running, biking, skating, skiing, or using a mechanical means of transportation among others. The routing graph may be designated for a particular type of transportation. For example, the routing graph may be designated a disabled path or designated for wheelchairs and avoid stairs or uneven surfaces. The routing graph may be designated for drones and include a height component to define an air space. A navigable space may include indoor spaces. For example, a navigable space may include an office building, a mall, a train station, a stadium, a shopping center, or an airport, among others. A navigable space may include outdoor spaces such as a park, an outdoor festival, a parking lot, or a nature preserve for example. A navigable space may include multiple levels and may connect to other navigable spaces. For example, an airport may contain multiple terminals, e.g. Terminals A, B, and C. The navigable space of Terminal A may be considered a separate navigable space, but also connected to Terminals B and C. A user may need to travel through multiple navigable spaces to achieve a destination. Navigable spaces may also be connected to road maps. For example, the entrance to a store, itself a navigable space, may be connected to the navigable space of a parking lot that may be connected to a roadway map of a city. Each navigable space may be connected at one or more points to one or more other spaces.

The map or layout of the pedestrian space may be generated through use of computer aided design (CAD) software. A map or layout may also be manually or automatically generated or derived from aerial imagery. The layout may be manually generated by using the CAD software or another program or interface to trace the edges of the pedestrian space according to a user input. Alternatively, the user input may select the vertices of the pedestrian space, which are connected to form the edges of the pedestrian space. The layout may be manually generated using an image processing technique such as edge detection, feature extraction or transforms (e.g., scale invariant feature transform), or vector classification. In edge detection, the brightness, or another image characteristics, of adjacent image pixels of an aerial image. In feature extraction or transforms, the aerial image or another layout image is analyzed to identify particular features that indicate the layout. The features may include walls, fences, tree lines, or other boundary elements that shape the layout. Similarly, vector classification may compare vectors representative of boundary elements to vectors from the aerial image or other layout image.

In the case of outdoor spaces, the aerial image may be a satellite image collected from a satellite or another device in orbit or outside of the atmosphere, collected by a high flying aerial vehicle (e.g., unmanned aerial vehicle, airplane or helicopter), or collected by a low flying aerial vehicle (e.g., drone). In the case of indoor spaces, the aerial images may be collected by a low flying aerial vehicle or collected manually from a high vantage point with the indoor space. The high vantage point may be from a ladder, a catwalk, or through a window.

Figure 4B:
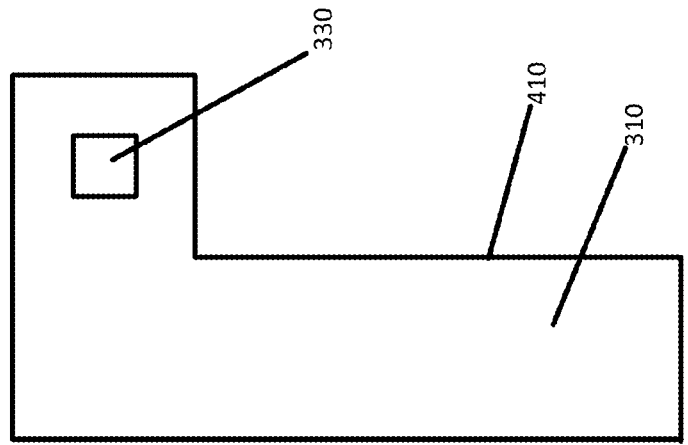
FIGS. 4A and 4B illustrates an example of a navigable space and a polygon.
Figure 4A:
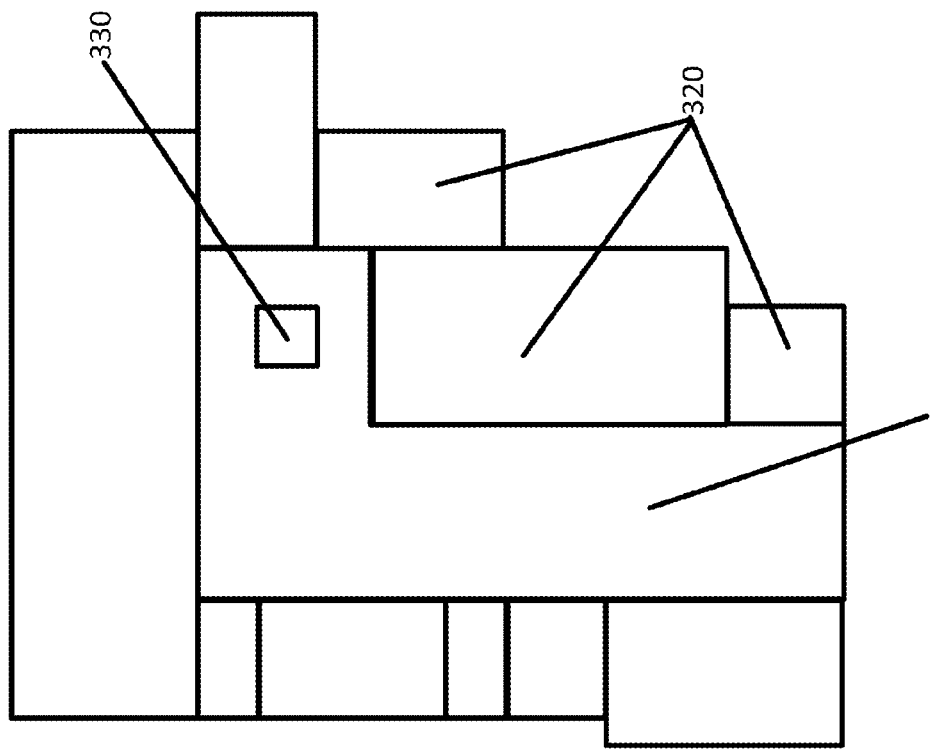

FIG. 4A illustrates an example of a layout of a navigable space. FIG. 4A includes multiple different spaces. For the purposes of this example, the navigable space 310 may be considered the navigable space to be mapped. Each of the other spaces 320 may be considered a separate space (connected by a destination point). A routing graph for the other spaces may be generated and connected to the routing graph for the hallway. A non-navigable space 330 may be a hole, a fountain, an elevator, a support column, furniture, or another obstruction in the hallway.

As act 110, the server 125 generates a polygon from the navigable space 310. FIG. 4B illustrates a polygon 410 generated from the navigable space 310 illustrated in FIG. 3. The polygon 410 represents a boundary of the navigable space 310 with a non-navigable space 330 that is excluded. The polygon 410 which represents the navigable 310 includes both a boundary for the exterior of the navigable space 310 and also a boundary for the interior non-navigable space 330. Both the boundaries for the exterior and interior are used in the straight skeleton algorithm.

The polygon 410 may represent the area that is navigable. Certain areas, zones, or regions may be excluded from the polygon (such as the non-navigable space 330). Items or equipment such as furniture or engineering features may prohibit a person passing through. The area around a set of bookshelves or cubicles which although not a permanent obstruction may be excluded from the polygon 410. Other non-permanent features such as kiosks or tables may also be excluded. Obstacles that prevent walking (for a pedestrian) or otherwise traveling (for other modes of transportation) though an area may be excluded. Permanent structures such as a fountain, a tree, a garden, a low wall, a sculpture among other structures may be excluded from the polygon. Many of these features or structures or obstacles may not be simple shapes. For example, a kiosk may have included multiple edges and vertices which may drastically increase the computational resources and time to generate a straight skeleton. In order to increase efficiency, a bounding polygon may be used around each obstacle to simplify the edges and vertices. For example, a rectangle may be used to indicate the non-navigable area around a kiosk. Features and structures that are to be excluded may have different tolerances for how closely the bounding polygon follows the feature edges.

The polygon 410 may be generated automatically from the pedestrian space 310 or from a user input. The polygon 410 may also be manually drawn by a user. Additionally, areas, zones, or regions that may be excluded from the polygon may be done so automatically by the server 125 or manually by a user.

In certain embodiments, the server 125 may use tolerances or thresholds to generate or adjust the polygon 410. A straight skeleton for a polygon with N vertices has N−2 nodes and 2N−3 arcs. Each additional vertex or edge increases both the complexity of the calculation and potentially the number of nodes and segments included in a link node routing graph. In certain embodiments, the number of nodes (vertices) and arcs (edges) may be minimized. Certain edges may be combined into a single edge, and likewise, certain vertices may be removed or combined. An edge preserving smoothing process may be used to remove or straighten sections or segments using a tolerance level. A tolerance level may be applied to straighten sections that are substantially straight but contain multiple vertices and edges. The tolerance level may be a length or distance measurement between adjacent components of the polygon. Redundant data (vertices and nodes closer to each other than the tolerance) may be eliminated. Sets of duplicate edges (closer to each other than the tolerance) may be replaced by a single edge. Edges with angles close to 180 degrees or 360 degrees between them may be combined into a single edge. Examples for the tolerance level may include absolute values (e.g., 1 meter, 1 foot, or another value). The tolerance level may be relative values such as a predetermined percentage of a dimension or distance that spans the polygon 410. The dimension may be parallel to the adjacent components of the polygon 410.

Thresholds may be used to include or exclude certain area of the navigable space. For example, in one space, an alcove may not be included as the threshold may exclude spaces with an area smaller than a certain number of square meters (such as 0.1, 0.2, or 0.5 square meters). For different types of spaces, the server 125 may use a different set of thresholds. For example, the server 125 may exclude certain areas where the pedestrian space is an airport, but include similar spaces if the pedestrian space is an office building.

The edges and nodes of a polygon 410 may be adjusted after the polygon is generated or during the generation process. When generating or adjusting the polygon 410, the attributes of any original edges and nodes (such as before two nodes are combined into one) may be maintained and carried over to the map database. In certain embodiments, specific edges and nodes may include an attribute that indicates that the edge or node is not to be changed or altered. For example, every edge and node may be protected depending on the level of accuracy that is required for the use of the routing graph. For example, a person may need less accurate directions than an autonomous vehicle and as such polygons that are to be used for human navigation may be less stringent in the representation of the original space. For walking directions, an angle change of one or two degrees may not be significant (and as such, adjacent edges may be combined). However, for an autonomous vehicle, even small directional changes may need to be captured by the routing graph.

At act 120, the server 125 performs a straight skeleton algorithm on the polygon 410. One or more different straight skeleton algorithms may be used depending on the configuration of the polygon 410. Different algorithms may perform more efficiently depending on how many sides make up the polygon 410 and the orientation of the polygon 410. For example, for a simple convex polygon, only edge events occur. For a non-convex polygon a different algorithm may be used. In certain embodiments, the polygon 410 may be separated into multiple polygons and then later be re-combined.

Each straight skeleton algorithm generates a wavefront of edges contracting or expanding (depending on the internal angle between adjacent edges). At non-reflex internal angles (more than 0° but less than 180° between adjacent edges), the edges contract, while at reflex angles (more than 180° but less than 360° between adjacent edges) the edges expand. As the edges expand or contract, vertices are created along the angular bisector of the lines subtending the edges. This continues until an event occurs. Edges may collide with one edge disappearing into another, which generates a node, or an edge may collide with another edge and split the polygon into two sections. The traces of the vertices form the arcs of the straight skeleton and the instants or points where events occur form the nodes.

Figure 5C:
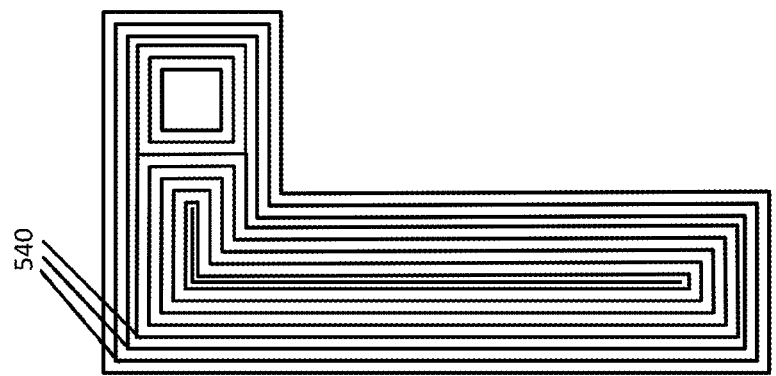
FIGS. 5A, 5B, and 5C illustrate examples of wavefront edges.
Figure 5B:
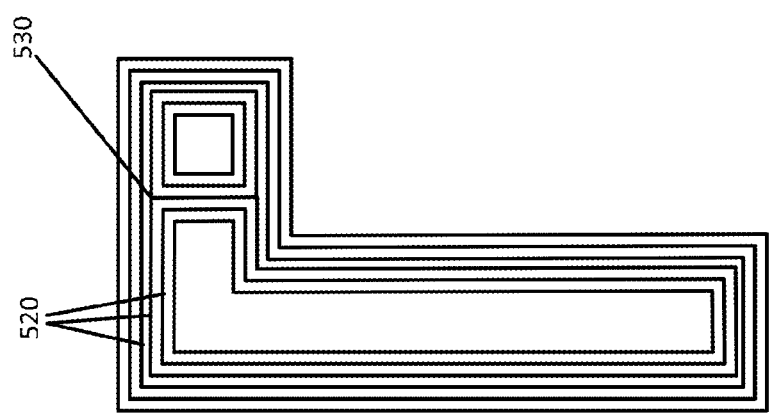
Figure 5A:
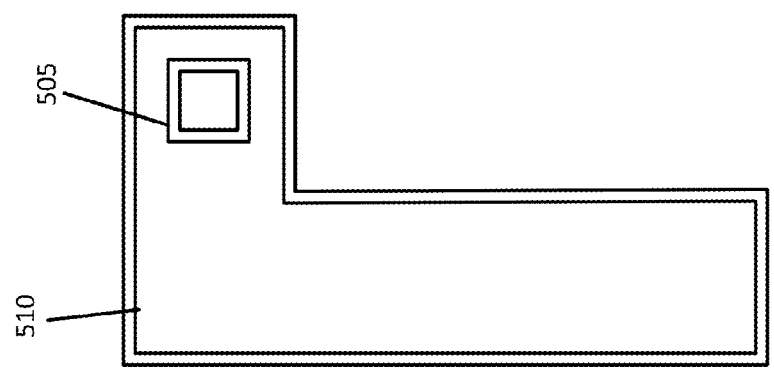

FIGS. 5A, 5B, and 5C illustrate examples of wavefront edges. In FIG. 5A, edges 505 and 510 represent a first set of edges generated by the algorithm. These edges 505 and 510 are offset from the polygon (and the interior excluded space). For exterior lines, the edges are generated inwards, for interior lines the edges are generated outwards. Each edge as it is generated also creates a vertex at the edge's endpoint. These vertices will be used to generate the skeleton lines. FIG. 5B depicts additional edges 520 as the edges are generated offset from the polygon (and offset from the interior excluded area). Nodes may be created where two lines meet such as at point 530. Edges continue to contract or expand until they run into another edge generating a node or line. FIG. 5C depicts the polygon after the algorithm has been run and the edges have all be generated. As shown, FIG. 5C includes multiple vertices 540 generated from the edges.

Figure 6:
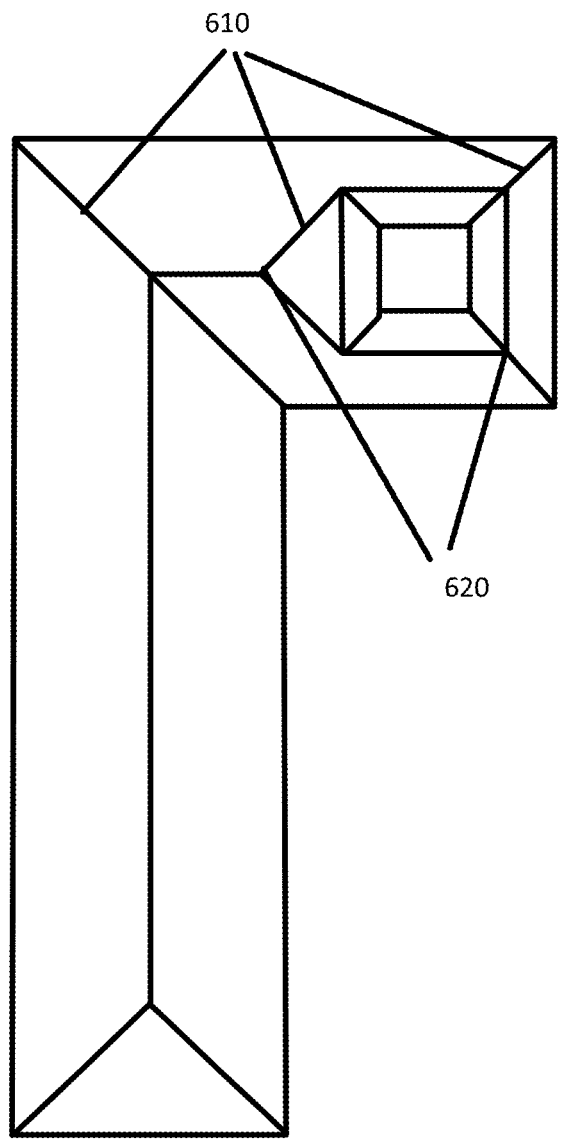
FIG. 6 illustrates an example of the straight skeleton lines of the polygon.

FIG. 6 illustrates the straight skeleton lines of the polygon 410. Skeleton lines or arcs 610 (generated by the straight skeleton algorithm) connect the vertices 540 from FIG. 5C that are at the intersection of the edges. Nodes 620 connect three or more arcs.

At act 130, the server 125 removes a subset of skeleton lines 610 from the polygon 410. Arcs that intersect the polygon 410 are removed as the intersecting arcs are not useful to a link node routing graph. The remaining arcs after the removal of the subset of arcs is a set of lines that approximate a centerline of the polygon. Also remaining are each of the nodes generated by the straight skeleton algorithm. The set of lines that approximate the centerline of the polygon (the center segments), may be adjusted. The segments may be adjusted by combining or eliminating certain segments. A tolerance level may be applied to straighten skeleton lines that are substantially straight but contain multiple segments. The tolerance level may be a length or distance measurement between adjacent segments of the straight skeleton. Depending on the complexity of the polygon, there may be numerous center segments, which are similar to adjacent segments. Redundant data (segments and nodes closer to each other than the tolerance) may be eliminated. Sets of duplicate segments (closer to each other than the tolerance) may be replaced by a single segment. For example, segments that have an angle within a predetermined range of 180 degrees may be considered similar and may be combined to generate a single segment. Combining segments may lead to a simplified link node routing graph and also simplified directions for navigating the graph. Examples for the tolerance level may include absolute values (e.g., 1 meter, 1 foot, or another value). The tolerance level may be relative values such as a predetermined percentage of a dimension or distance that spans the straight skeleton. The dimension may be parallel to the adjacent components of the straight skeleton.

Figure 7:
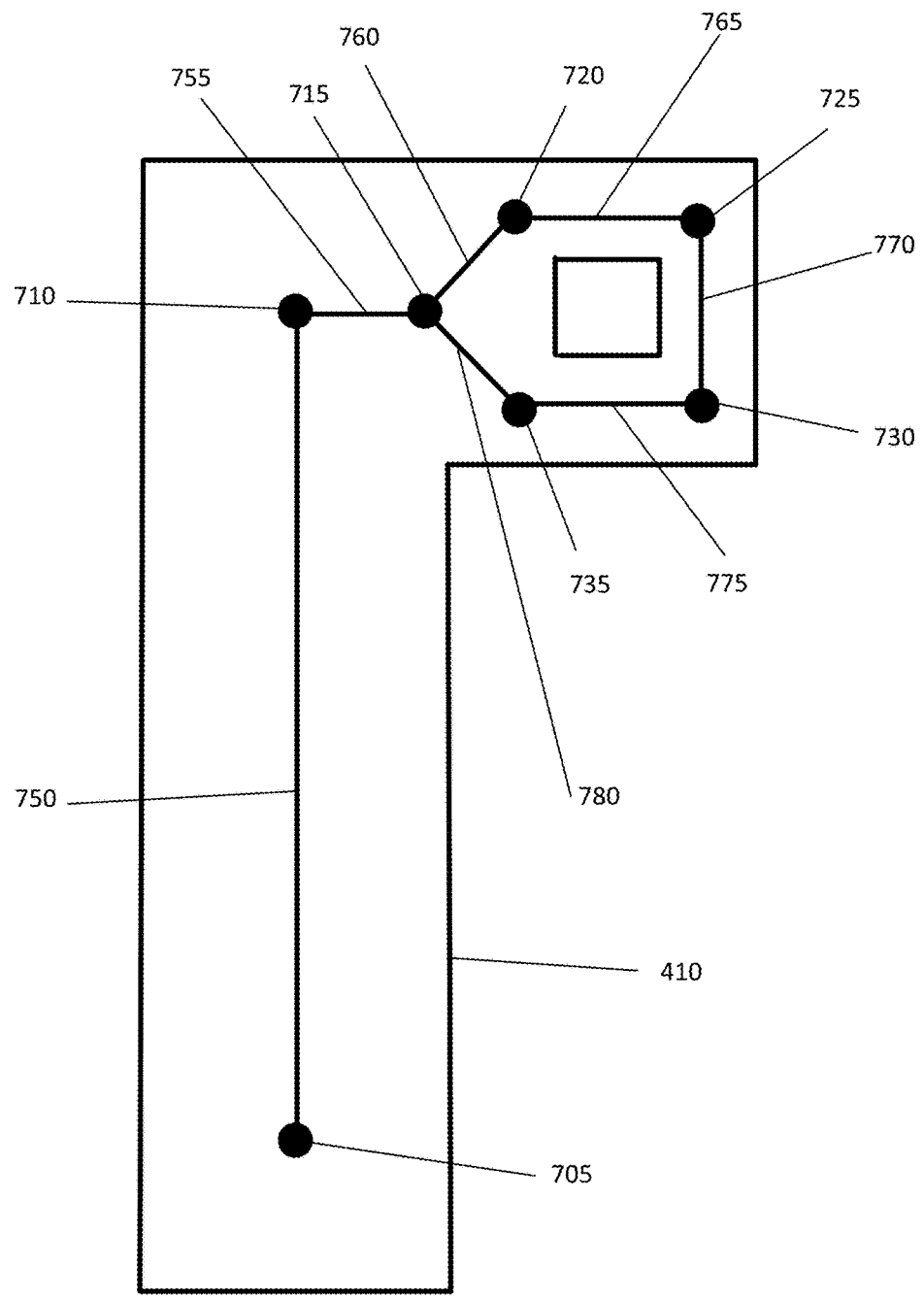
FIG. 7 illustrates example centerlines for the polygon.

FIG. 7 illustrates center segments 750, 755, 760, 765, 770, 775, 780 and nodes 705, 710, 715, 720, 725, 730, 735 for the polygon 410. The center segments 750, 755, 760, 765, 770, 775, 780 have nodes 705, 710, 715, 720, 725, 730, 735 at each end. These nodes may be identified by their positional coordinates (longitude and latitude) or may be given identifiers such as Node 0001, Node 0002, Node 0003 and so on. The center segments may be considered links that connect each of these nodes. For example, the center segment link 750 may also be represented by the two nodes that it connects. In this example, the two nodes are Node 705 and Node 710. The segment or link may also be described using distance and direction from a starting node or geographic location. The center segment 750 could be described as 90 degrees, 20 meters starting at Node 705. These center segments (of the approximated centerline) and nodes may constitute a link node routing graph. Using these links (center segments) and nodes, a user may navigate through the navigable space. The links and nodes are stored in the map database 123. Using these links and nodes, the mapping system may generate a link node routing graph which would also routes to be generated and refined using these links and nodes.

The link node routing graph may be used for navigational purposes, for instance, providing directions from one node (e.g., an origin node) to another node (e.g., a destination node). In FIG. 6, to go from Node 705 to Node 735, the set of directions may include (705,710,715,735). A set of directions may also be represented by the links included. For example, the links (750,755,780) would be included in directions to travel from Node 705 to Node 735.

In certain embodiments, the center segments (and nodes) may include attributes. The attributes may be stored alongside the segment or node data in the map database. Each segment or node database entry may include a field for one or more attributes. For example, an attribute may include the type of flooring (e.g. linoleum, carpet, pavement, wood, gravel, sand, crushed rock, or others), grade, or traction. Grade may be measured in altitude divided by distance. Traction may be measured in friction of the flooring. Other attributes include but are not limited to describing the environment of the segment such as lighting (e.g., a light scale factor measured from 1 to 10, a quantity of lumens, or a power rating) or temperature (e.g., degrees in Celsius or Fahrenheit). In addition to descriptions of the segments the attributes may also include information or data relating to traffic and or navigation. Data such as distance, travel time, traffic flow, among others may be measured or collected and used for routing and predicting traffic or arrival times. In the example given above for directions from Node 705 to Node 735, the travel times for each link may be added together to determine a travel time. For example, the link 750 may take 10 minutes to traverse. The link 755 may take 5 minutes to traverse, and the link 780 may take 3 minutes to traverse. To travel all three may take an estimated 18 minutes of travel time. The travel times may be adjusted as additional information is gathered. In certain embodiments, the travel times may be static. For example, a trip through a park may not be affected by traffic among other factors. In certain embodiments, the travel times may be variable for each segment depending on multiple factors (such as actual traffic, link conditions, weather, and time of day, among others).

In certain embodiments, nodes may also contain attributes. For example, the nodes may include positional coordinates such as latitude, longitude, and/or altitude. The nodes may also represent destinations as described below. The nodes may be points of interest or be identifiable through visible indicators.

Figure 8:
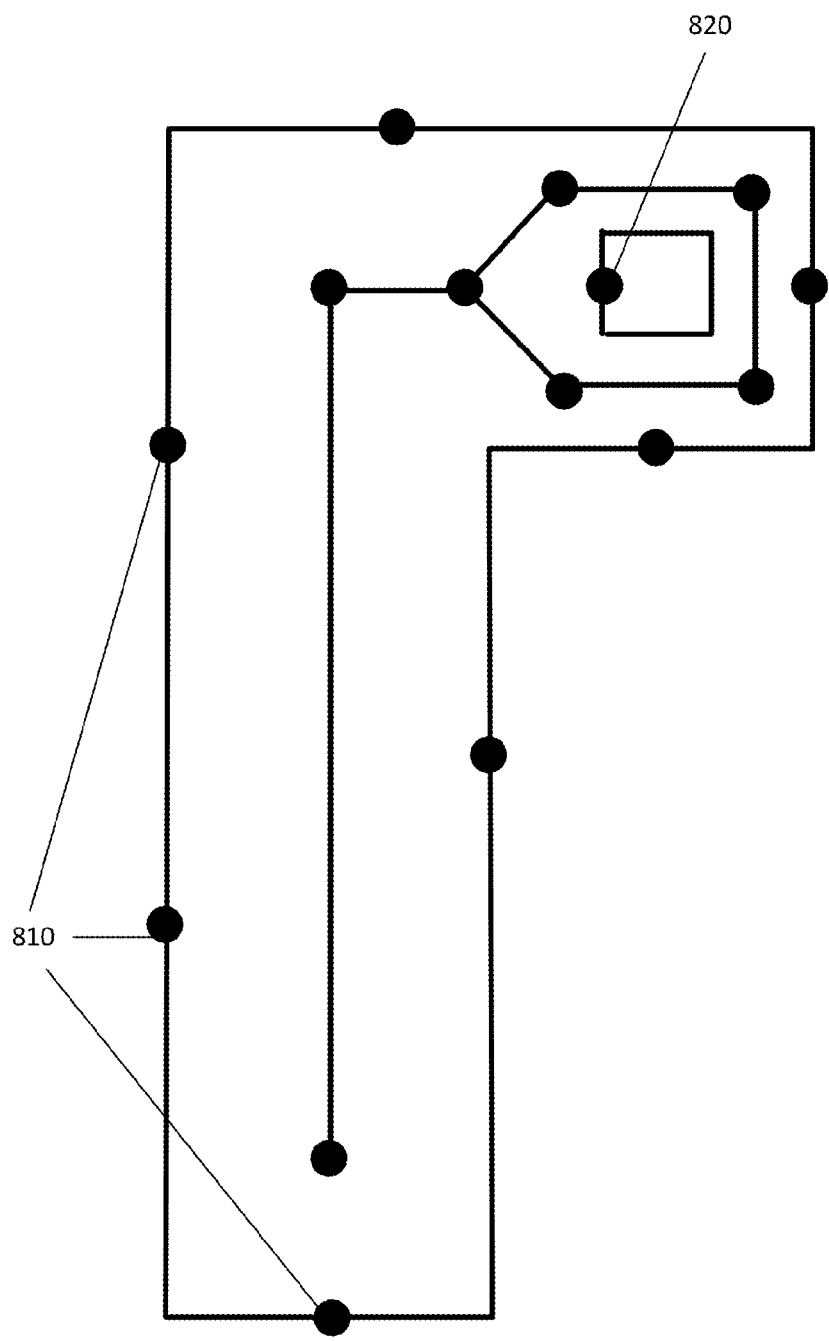
FIG. 8 illustrates example destinations for the polygon.

At act 140, the server 125 identifies destinations on the polygon 410. FIG. 8 illustrates the destinations 810, 820 for the polygon. FIG. 8 depicts destinations 810 on the outer polygon 410 and one destination 820 on the interior polygon representing the non-navigable space 330. Destinations 810, 820 may be located on an edge of a polygon. An interior polygon such as the non-navigable space 330 may be created to allow for a destination in the middle of the polygon 410.

Destinations 810 may include multiple types. One type is a connector to a different space or a different polygon. For example an entrance or exit for a building may be considered a connecter to the exterior of the building (or a different space). An escalator, stairways, or elevator may be a connector to a different floor (and potentially a connected different space or polygon). A destination 810 may also be a connector to a new space such as a separate room or store. For example, a doorway may be considered a destination 810. The space behind the doorway may be considered a separate polygon with different rules. A department store in a mall may be connected to a main hallway though an entrance or doorway. Even though the space in the department store and hallway are both navigable, the department store may maintain a layout or map that is separately mapped. In certain embodiments, a space behind the doorway may not be mapped such as if the room or space is small and does not require navigable segments and/or nodes. For example, a door to a restroom may be a destination 810, but the restroom may not be mapped as it may be too small to require links and nodes.

Additionally, by splitting up large complex polygons, the computational resources to generate the polygon and therefore skeleton is reduced. Different and separate polygons may also allow for regions to be updated or changed without having to re-run the algorithm on the entire space. For example, in an example with multiple spaces connected through destination points, one or more spaces could be closed for construction or for another reason and the entire link node routing graph would not have to be re-run. The destinations that connected the closed spaces may indicate that they are no longer a connecter to the spaces under construction.

Destinations 810 may also be specific locations. For example, an object of interest such as an automatic teller machine (ATM), a drinking fountain or a fire extinguisher may be identified as a destination even though the fountain or extinguisher is not a gateway or connector to a separate space. Destinations may also be points of interest such as a specific point location that may be useful or interesting to a user.

Destinations 810 operating as nodes may include attributes or other information. Destinations 810 may include positional coordinates such as latitude, longitude, and/or altitude. Destinations 810 may also include information regarding features located at the destination such as if the destination is a connector to a separate space or if the destination is a point of interest. A unique identifier may be assigned to each destination. Identifiers such as aliases may also be included or stored alongside the destination.

Figure 9:
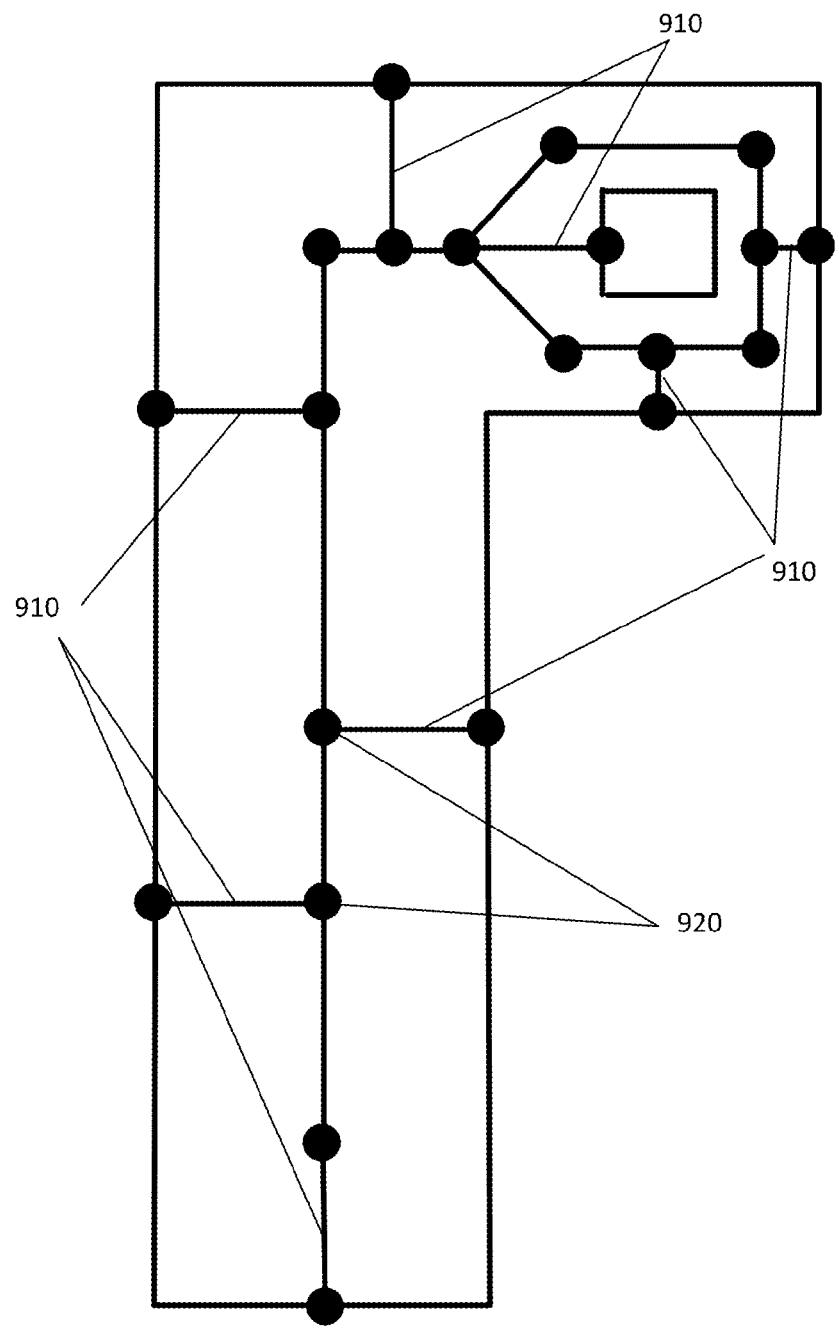
FIG. 9 illustrates example destination segments.

At act 150, the server 125 generates destination segments. FIG. 9 illustrates examples of destination segments 910. Destination segments are generated from the destinations 810 to the center segments (750, 755, 760, 765, 770, 775, and 780). Where the destination segments 910 connect to the center segments, a node 920 is created. The destination segments 910 may be perpendicular to the center segments. Being perpendicular may lead to an easier set of directions (turn right, turn left, instead of veer off to the right at a specific angle). In certain embodiments, the destination segments 910 are not perpendicular, e.g. the destination segments 910 are drawn to be the shortest path between the destination 810 and a center segment. In certain embodiments, in order to simplify a resulting graph, multiple destination segments 910 may connect to a center segment at a specific node regardless of the angle the destination segments 910 form with the center segment. In certain embodiments, destinations 810 may be combined to form a single destination.

At act 160, the server 125 generates a routing graph from the destinations 810, the destination segments 910, the center segments, and any intersections generated between segments. The intersections and the destinations are the nodes for a link node routing graph. The destination segments 910 and center segments may be the links for the link node routing graph. Where the segments meet up or end are the nodes for the link node routing graph. A link node routing graph may be represented in multiple ways visually. The nodes (or vertices) may be waypoints or destinations; the links (or segments) may represent the relationships between the nodes (such as distance and direction).

Figure 10:
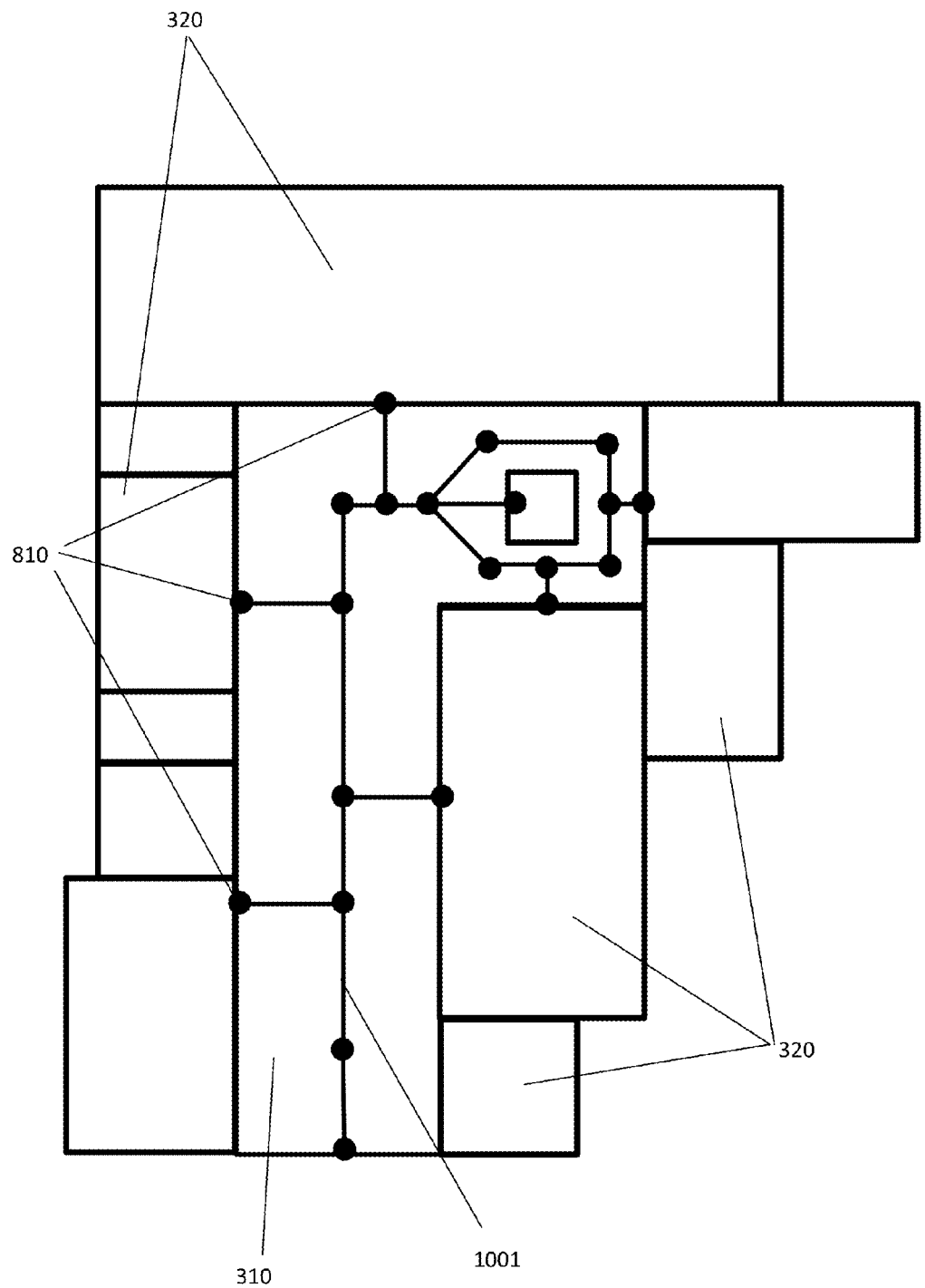
FIG. 10 illustrates an example of a routing graph for the polygon of FIG. 4.

FIG. 10 illustrates an example of a routing graph 1001 for the polygon 410 (representing the hallway 310) of FIG. 4B layout on top of the navigable space of FIG. 3. The destinations 810 may be viewed as connectors to other navigable spaces 320. The routing graph includes both nodes and links. Each node and each link may be assigned a unique identifier such as the geographic coordinates of the node. Other identifiers may be used. Each individual node and link may include attributes such as how the nodes and links are connected together. The nodes, links, and attributes may be stored in a database or map database. The map database may then be used to generate routes or navigational help.

The server 125 may transmit the routing graph to one or more devices 122. The server 125 may operate as a mapping service or navigation service and use the routing graph to generate routes or paths that may be requested by the one or more devices 122.

In certain embodiments, a routing graph for a polygon may be optimized using an additional set of segments. Certain spaces and polygons may generate center segments that are distant from the destinations and may not be the most natural travel path for a user. For wide hallways or large open junctions where hallways meet, perimeter segments may be added. This is accomplished by re-running the straight skeleton algorithm, stopping it before finding the center segments, and using the perimeter of one or many of the intermediary polygons as part of the routing graph. The start and end points are connected each to the main polygon, preferring perpendicularity to the shortest line distance.

The approach generates smoother, more natural routing graphs. This in turn better supports real-time turn-by-turn navigation guidance and voice guidance by eliminating unnecessary turns. For example, voice guidance for a jagged path may include a succession of incremental turns, but the more natural routing graph includes longer and more direct links that includes fewer turn-by-turn directions in voice guidance or other guidance. It supports better visualization by drawing lines down the center of the open spaces or as opposed to hugging the walls or meandering.

Figure 11:
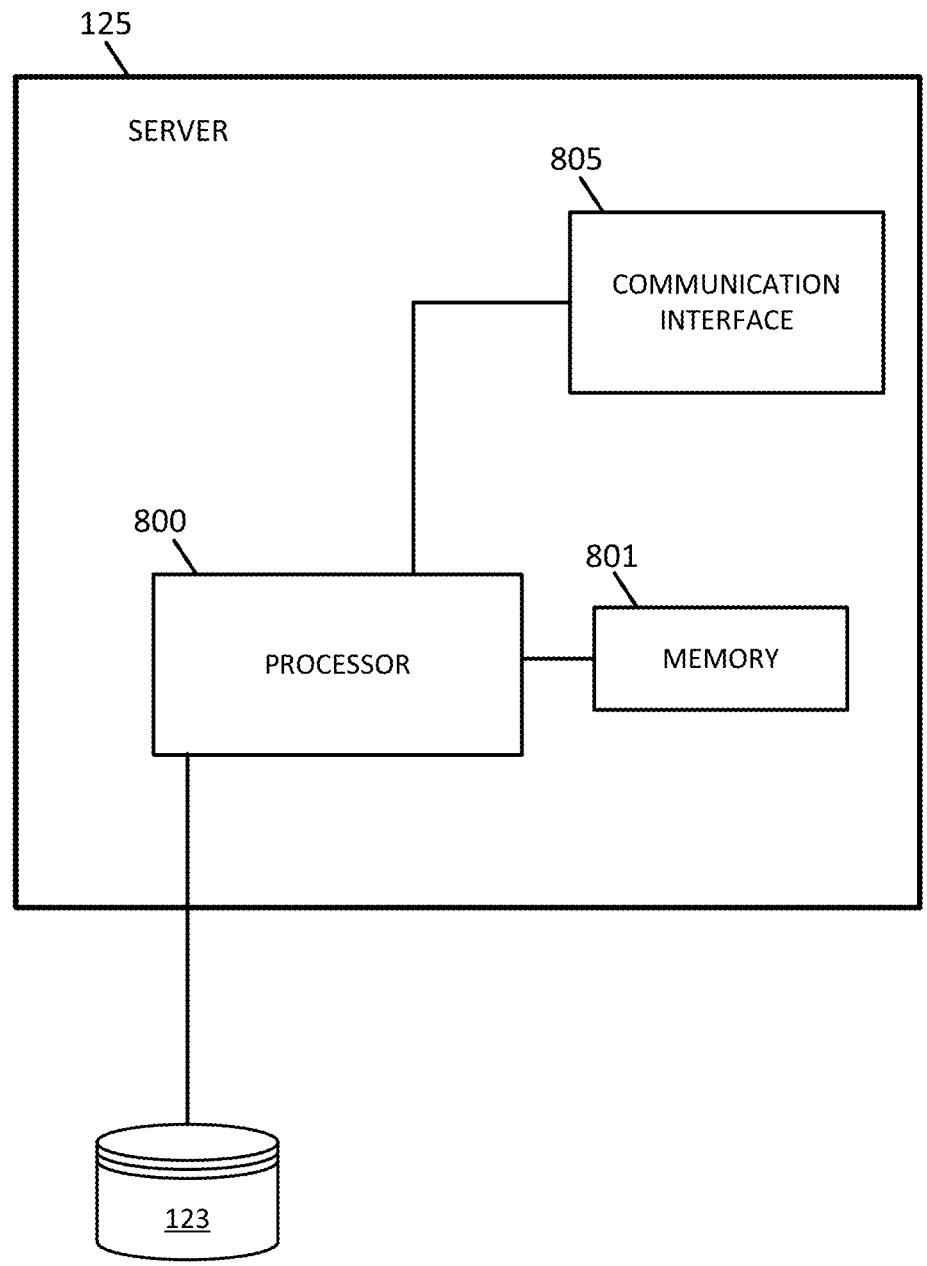
FIG. 11 illustrates an example mapping system for generating a routing graph for a navigable space

FIG. 11 illustrates a mapping system 121 for generating a routing graph for a navigable space. The system comprises a server 125 and a map database 123. The server 125 comprises a processor 800, a communication interface 805, and memory 801.

Figure 12:
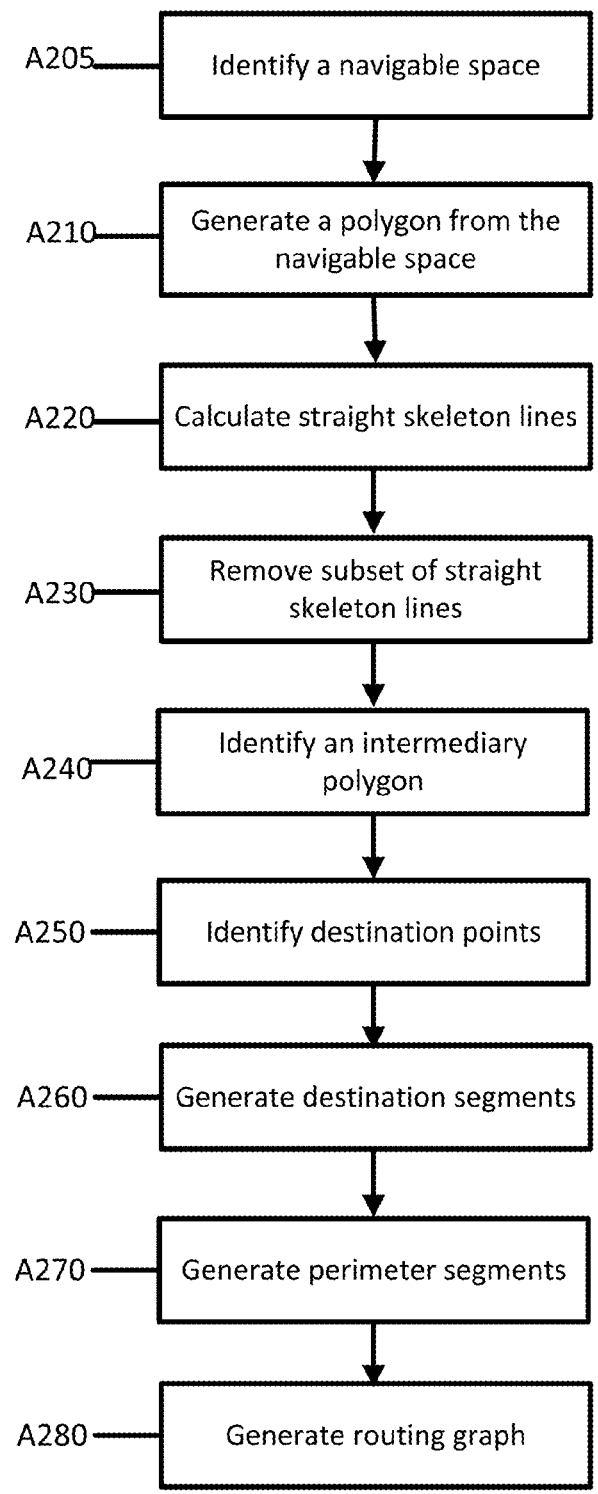
FIG. 12 illustrates an example flow chart for generating a link node routing graph for a navigable space.

FIG. 12 illustrates an example flow chart for generating a link node routing graph for a navigable space. As presented in the following sections, the acts may be performed using any combination of the components indicated in FIG. 2, FIG. 12, or FIG. 18. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act 205, the processor 800 identifies a navigable space. The navigable space may be received from an outside source or may be stored in memory. The navigable space may be indoor or outdoor. The navigable space may a pedestrian space or used by other forms of transportation. The navigable space may be received from a business, governmental agency, or other source using the communications interface 805. The navigable space may be previously stored in memory 801.

At act 210, a polygon is generated by the processor 800 from the navigable space identified at act 205. FIG. 13A illustrates a polygon 1300. The polygon 1300 has 12 edges and no interior holes. The polygon 1300 has a large open junction 1305 between the left side and the right side. Navigating only through the center of the polygon may be improved upon by adding one or more intermediary polygons. A polygon may be different shapes and sizes than the polygon 1300 illustrated by FIG. 13A. For example, the polygon may have non-navigable spaces in the interior. The polygon may also have numerous edges. In such a case, the polygon may be cleaned up or smoothed by removing or combining certain edges that are similar to adjacent edges.

At act 220, straight skeleton lines 1410 are calculated by the processor 800. The straight skeleton algorithm generates a wavefront of edges 1310 which contract (or expand). As the edges move, vertices move along the arcs (angular bisector) of the lines subtending the edges. This continues until an event occurs. Edges may collide with one edge disappearing into another, which generates a node, or an edge may collide and split the polygon into two sections. The traces of the moving vertices form the arcs of the straight skeleton and the instants or points where events occur form the nodes. Nodes connect three or more arcs.

Figure 13B:
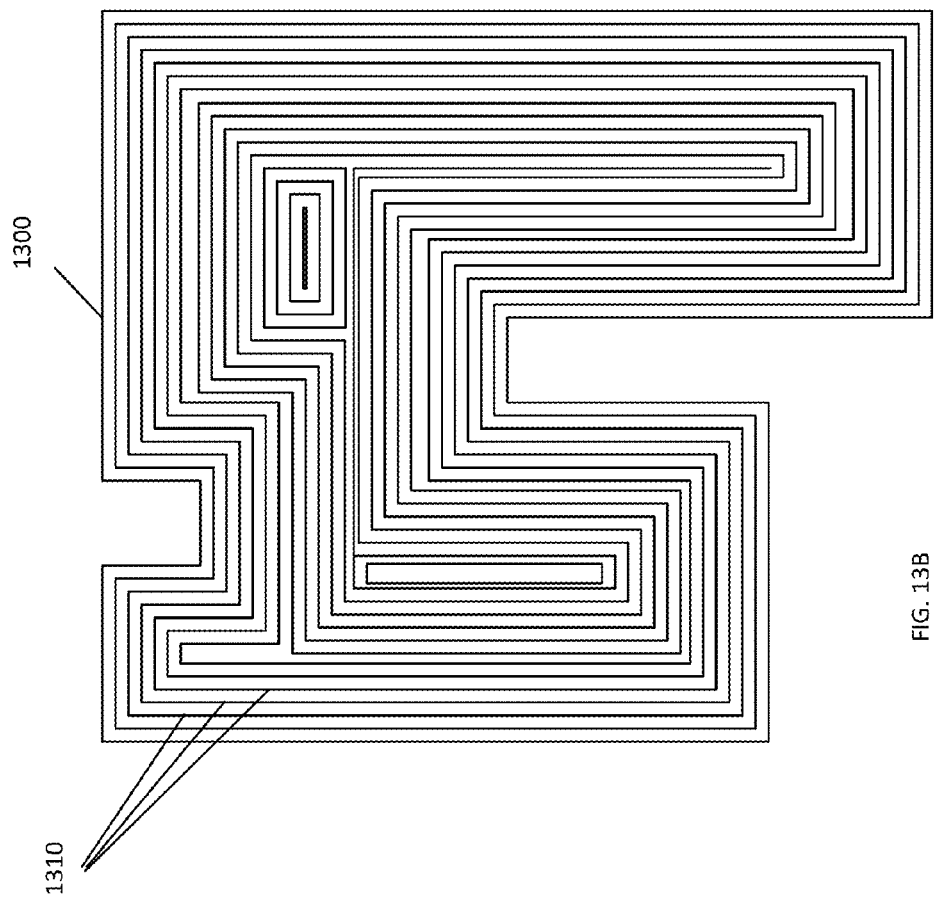
FIG. 13B illustrates example wavefront edges used in a straight skeleton algorithm.
Figure 13A:
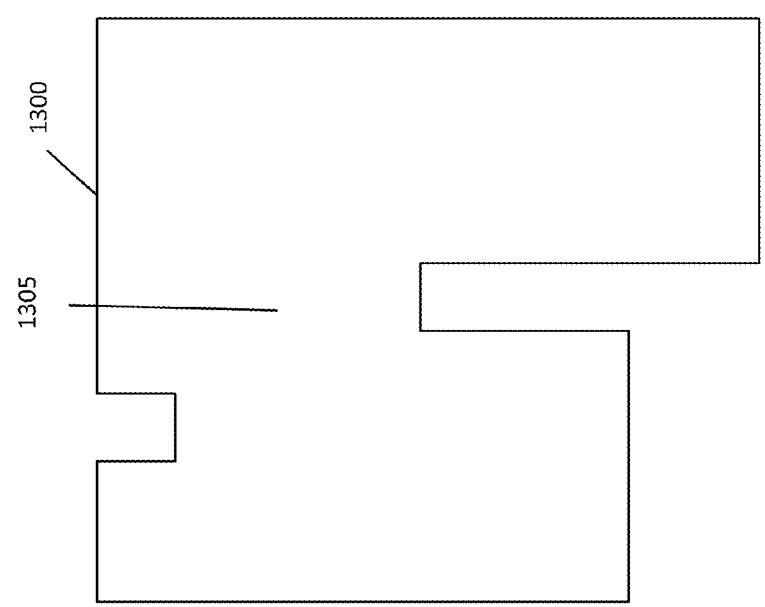
FIG. 13A illustrates an example polygon.
Figure 14B:
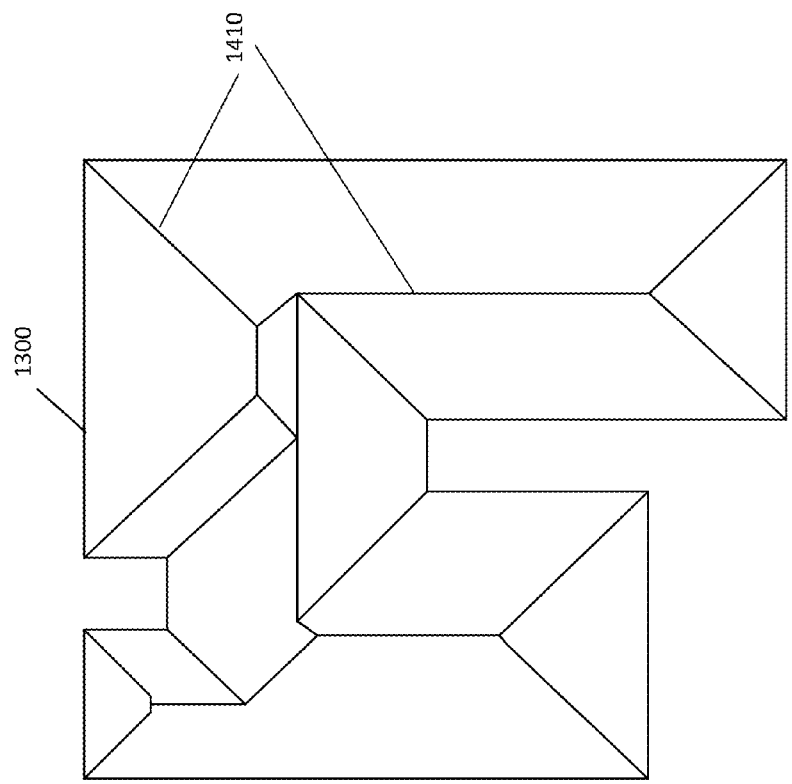
FIGS. 14A and 14B illustrate example skeleton lines connecting arcs.
Figure 14A:
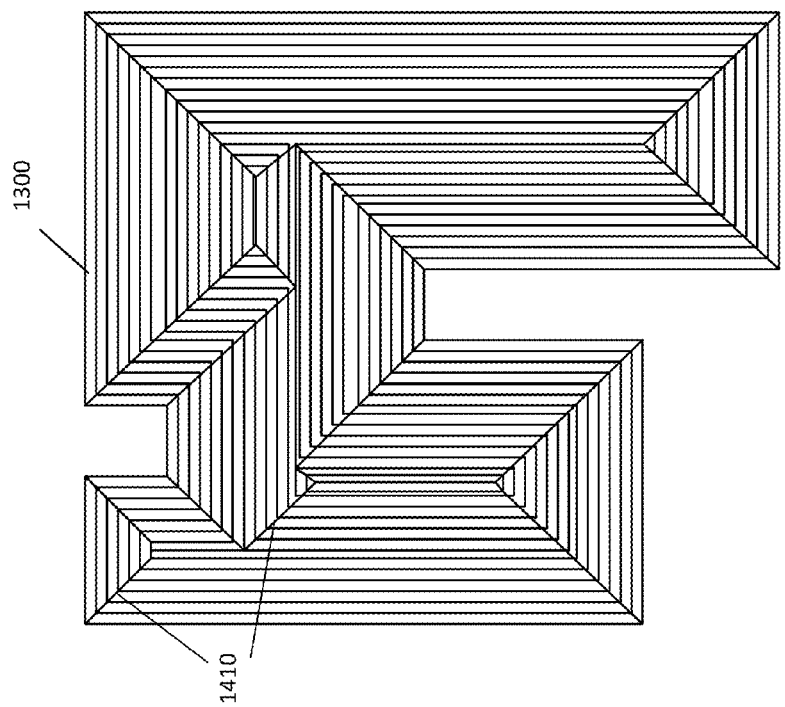

FIG. 13B illustrates the wavefront edges 1310 used in the straight skeleton algorithm. FIGS. 14A and 14B illustrate the skeleton lines 1410 generated that connect the arcs (angular bisectors). A straight skeleton for a polygon P with N vertices will have N−2 nodes and 2N−3 arcs. The polygon from FIG. 14B has 12 vertices and as such 10 Nodes and 21 Arcs.

Figure 15B:
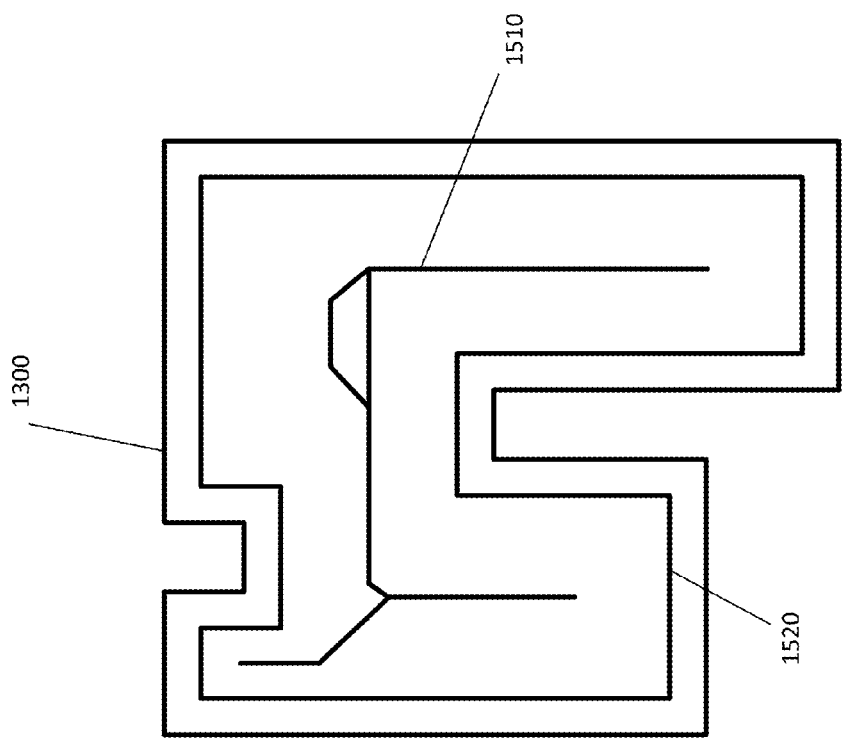
FIG. 15B illustrates an example intermediary polygon generated by the straight skeleton algorithm.
Figure 15A:
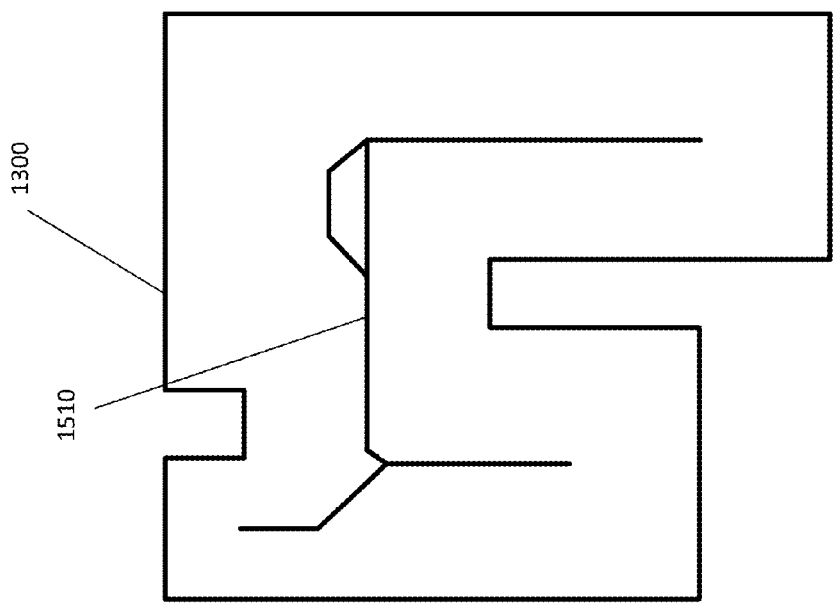
FIG. 15A illustrates example center segments after removing a subset of the skeleton.

At act 230, once the skeleton lines 1410 have been calculated, the processor 800 removes a subset of the skeleton lines. The subset includes the skeleton lines, which connect to the polygon. This subset of lines will not be used in the routing graph. FIG. 15A illustrates the center segments 1510 after removing a subset of the skeleton.

At act 240, the processor 800 identifies an intermediary polygon a first offset distance from the polygon. FIG. 15B illustrates an intermediary polygon 1520 generated by the straight skeleton algorithm. The intermediary polygon 1520 is offset from the polygon by a predefined distance.

In act 220, the straight skeleton algorithm generates a wavefront of edges that contract or expand from the polygon 1300. In act 240, the straight skeleton algorithm may be re-run and stopped mid-process to identify an intermediary polygon 1520. In certain embodiments, the intermediary polygon 1520 may be identified while calculating the straight skeleton lines in act 220 when the straight skeleton algorithm first operates on the polygon. The intermediary polygon 1520 may be identified by using an offset from the polygon at a predetermined distance. In certain embodiments, the processor 800 may only generate a wavefront of edges from an exterior polygon (or only use an intermediary polygon 1520 that is offset from the exterior polygon).

Using the intermediary polygon 1520, the processor 800 may generate more natural routes or paths. The predetermined distance may depend on the type of navigable space being mapped. The intermediary polygon 1520 may be venue specific. For example, a larger hallway may indicate that people may be more natural walking closer to a wall rather than through the center of the hallway. The predetermined distance may be requested by an operator of the navigable space. The intermediary polygon 1520 may be located halfway between a wall and the center segments. The intermediary polygon 1520 may be located 1 meter, 2 meters, or 5 meters or more for example from the polygon (wall).

In certain embodiments, multiple intermediary or perimeter polygons may be used. Different intermediary polygons may be used in different regions of the navigable space. For example, narrow hallways may not require an intermediary polygon (and perimeter path). Larger wide open spaces may use multiple intermediary polygons to define multiple paths for a user. One or more intermediary polygons may be used as parallel lanes. For example—one lane for pedestrians, one lane for robots, or one for Segways. The lanes may be parallel and separated by an equal distance from one another.

The predetermined distance and the decision to use one or more intermediary polygons for the navigable space may be made on a space-by-space basis. An intermediary polygon may be added or removed after receiving traffic data or feedback from the navigable space.

Figure 16B:
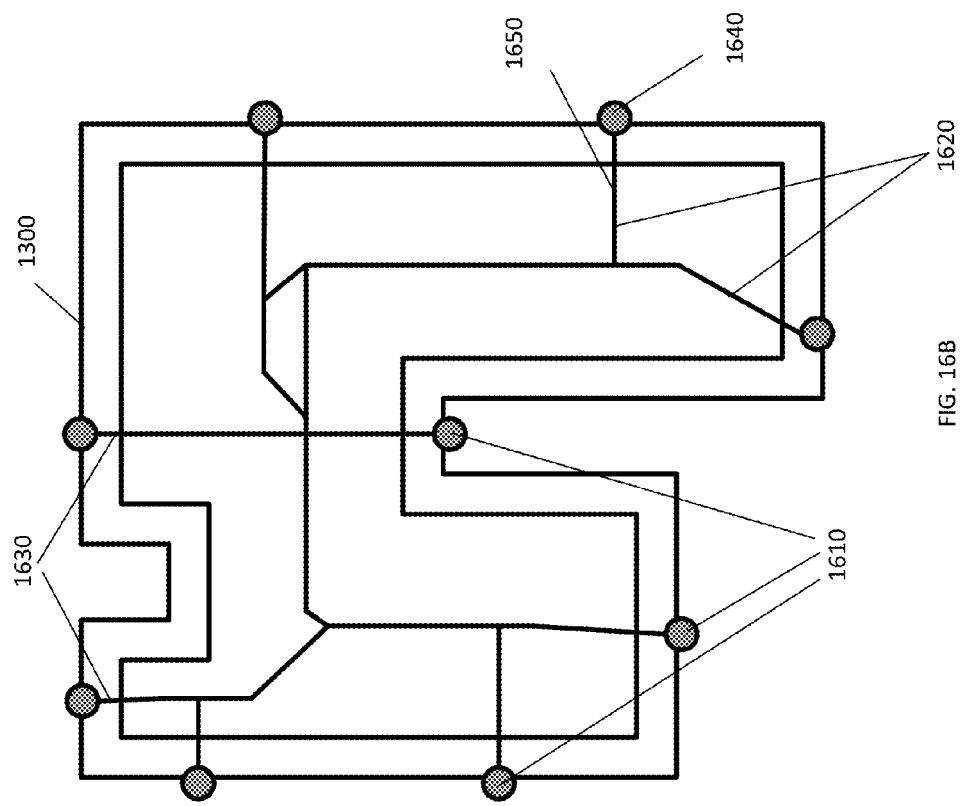
FIG. 16B illustrates example destination segments from the destinations to the center segments.
Figure 16A:
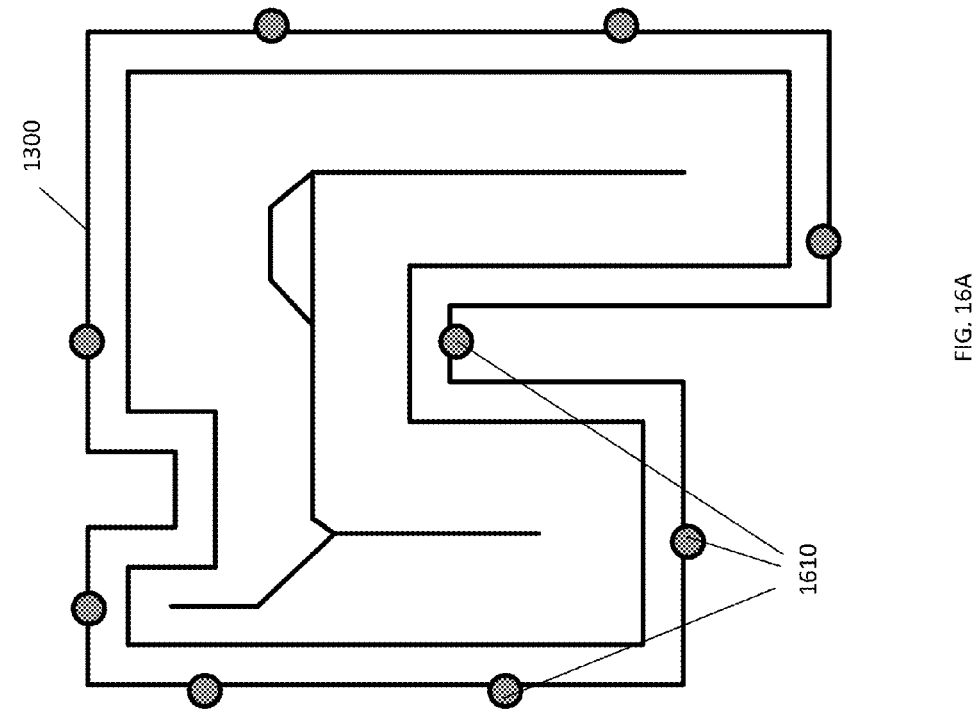
FIG. 16A illustrates example destination points on the polygon.

At act 250, the processor 800 identifies one or more destination points in the navigation space. FIG. 16A illustrates destination points 1610 on the polygon 1300. Each of these destination points 1610 may be labeled with a unique identifier such as the geographic coordinates (latitude, longitude, or altitude). The destination points 1610 and geographic coordinates may be stored in the map database.

The destination points 1610 may also have been identified when the polygon 1300 is generated from the navigation space. The destination points 1610 may represent multiple different types of destinations. Destination points 1610 may indicate a doorway or a connector to a different navigable space (and potentially, a different polygon). A destination point 1610 may represent a connection with a roadway network. For example, the entrance for an airport may lead to a taxi line, which is connect to a link node routing graph including roadway segments and nodes. By connecting at destination points, paths, routes, and directions may tie separate spaces together. The destination points may be stored in memory or the map database to also a mapping service to navigate freely from one navigable space to another.

A destination point 1610 may also be a point of interest. A point of interest may be any location that is of interest to a user or navigation service. Places of business, hotels, restaurants, and medical providers—among others—may all be points of interest. Along with an identifier (or name) of the point of interest, the destination point or node may include multiple other attributes or data records that may be stored in memory or the map database.

A destination point 1610 may also indicate a waypoint. A waypoint may be a type of point of interest, which is useful for navigational services but may not be of interest to a casual user.

At act 260, the processor 800 generates one or more destination segments from the center segments to the destination points. FIG. 16B illustrates destination segments 1620 from the destinations to the center segments. FIG. 16B also illustrates perimeter segments 1630. As illustrated for destination point 1640, the destination segment 1650 intersects with the intermediary polygon 1520. A node is created at that intersection and the destination segment is split into two segments.

The destination segments 1620 may be perpendicular to the center segments. Where the destination segments 1620 connect to the center segments, a node is created. Where the destination segments 1620 intersect with the perimeter or intermediary polygon, nodes are created.

At act 270, the processor 800 generates perimeter segments 1630. A segment from the intermediary polygon 1520 to a destination may be referred to as a perimeter segment 1630. Perimeter segments 1630 may also be generated during act 260. For example, the intermediary polygon 1520 may split a destination segment into two separate segments for purposes of the link node routing graph generated later at act 280.

At act 270, the processor 800 generates a link node routing graph 1710 for the polygon 1300. The link node routing graph 1710 includes the nodes from the center segments, nodes from the destination points, the nodes where the destination segments intersect with the intermediary polygon 1520, and nodes on the intermediary polygon 1520. The link node routing graph further includes links (segments) such as the center segments, the destination segments, and segments that make up the intermediary polygon 1520.

Figure 17:
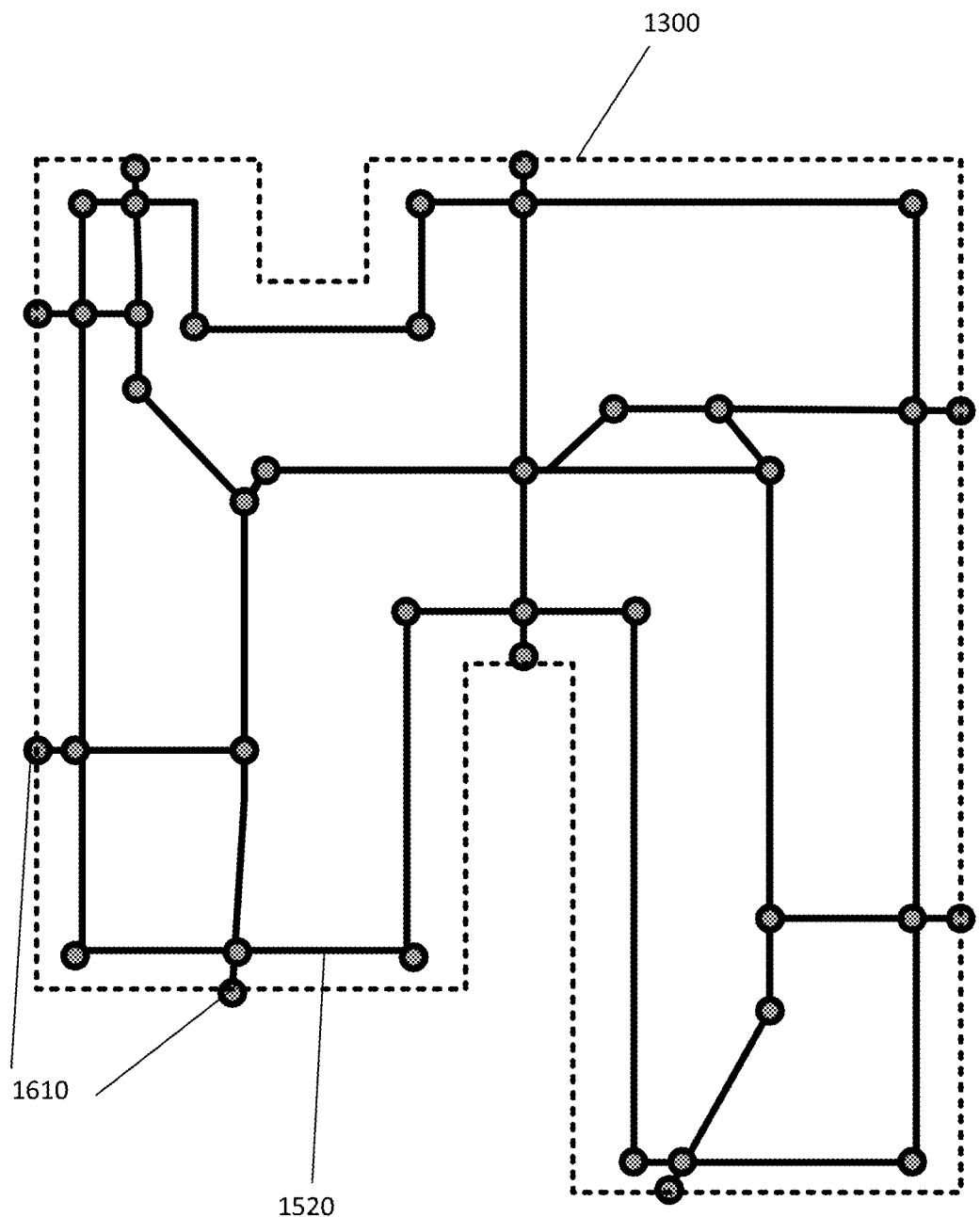
FIG. 17 illustrates an example link node routing graph for the polygon of FIG. 13A.

FIG. 17 illustrates a link node routing graph (solid lines and nodes) for the polygon 1300 (dotted line) of FIG. 13A. Each of the links and each of the nodes may be uniquely identifiable. Each of the links and each of the nodes may include attributes. The attributes and identifiers of the links and nodes are stored in the map database. Using properties (connections or locations) of the links and nodes, the map database may provide navigational services such as route or path planning from one node to another. Using the attributes (travel time, traffic, among others), the map database or mapping service may provide additional information or data for use in navigating spaces.

Figure 18:
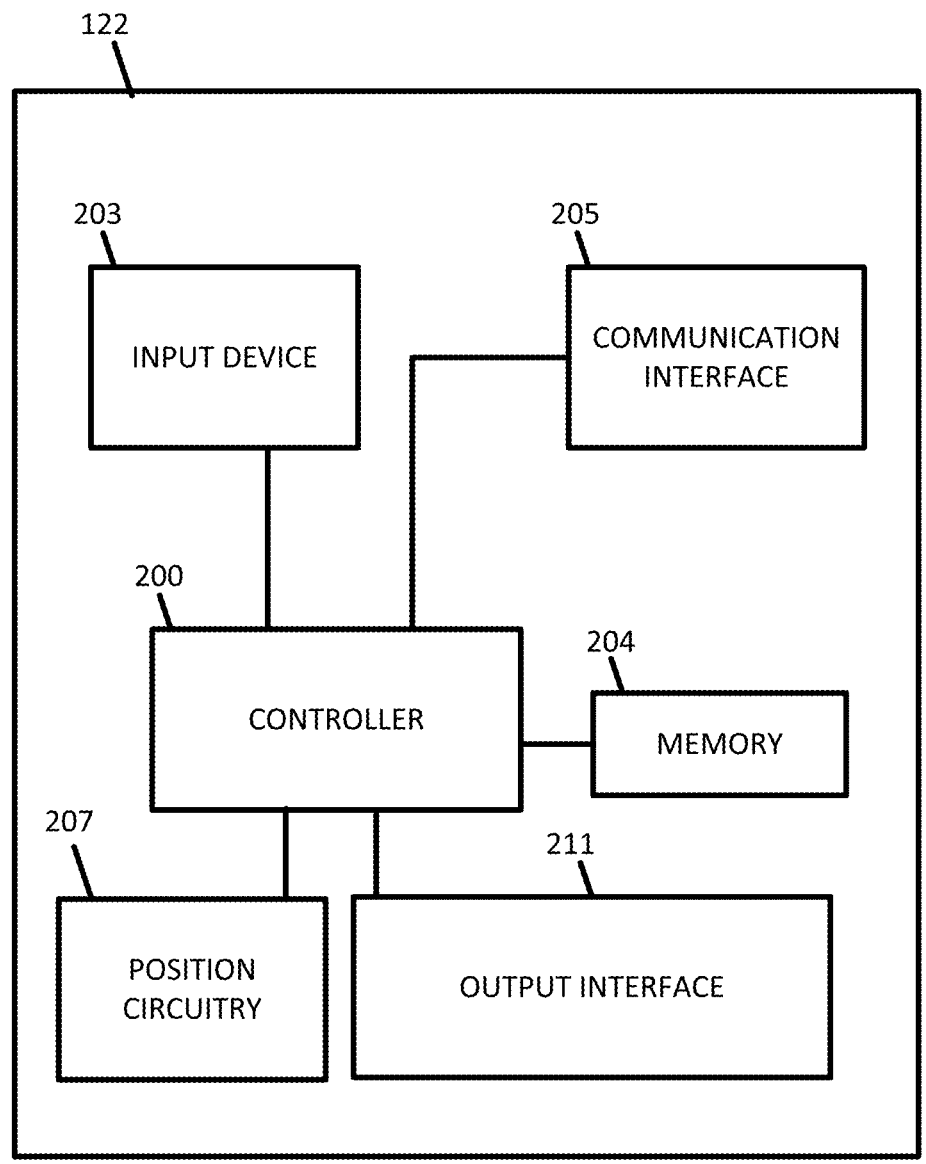
FIG. 18 illustrates an example device for receiving a route for a navigable space.

FIG. 18 illustrates an exemplary device 122. The device 122 may be configured to receive, process, and display data to a user. The device 122 may also be referred to as a mobile device 122 or a navigation device 122. The navigation device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle.

Figure 19:
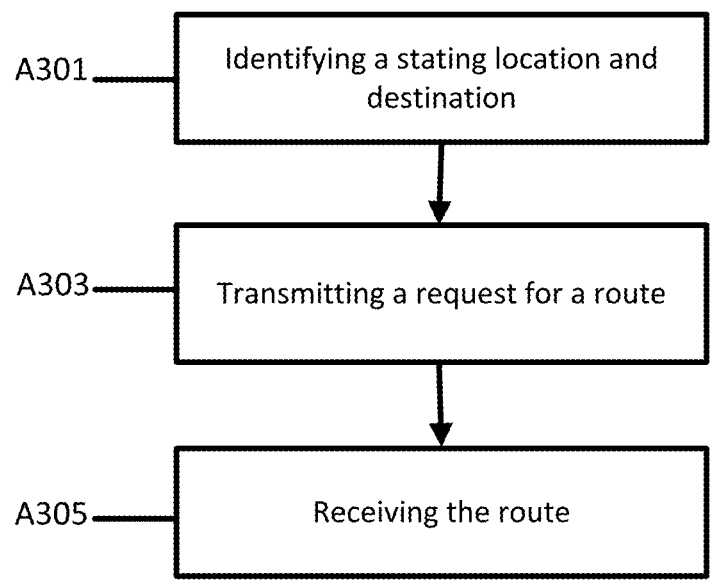
FIG. 19 illustrates an example flow chart for receiving a link node routing graph for a navigable space.

FIG. 19 illustrates an example method for receiving a link node routing graph for navigable spaces. As presented in the following sections, the acts may be performed using any combination of the components indicated in FIG. 2, FIG. 12, or FIG. 18. The following acts may be performed by device 122, server 125, or a combination thereof. Additional, different, or fewer acts may be provided. The acts are performed in the order shown or other orders. The acts may also be repeated.

At act A301, a navigation device 122 identifies a starting location and a destination. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The starting location may be identified using positional circuitry such as GPS or other positional inputs. The positioning circuitry 207, which is an example of a positioning system, is configured to determine a geographic position of the navigation device 122. The movement circuitry 208, which is an example a movement tracking system, is configured to determine movement of a navigation device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203.

The navigation device 122 may identify its position as it travels along a route using the positional circuitry. For indoor spaces without GPS signals, the navigation device 122 may rely on other geolocation methods such as LIDAR, radar, Wi-Fi, beacons, landmark identification, inertial navigation (dead reckoning), among others. The position of the navigation device 122 may be transmitted to a server or mapping service.

At act A303, the navigation device 122 transmits a request for a route from the starting location to the destination. The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver and/or transmitter for digital radio signals or other broadcast mediums. A receiver and/or transmitter may be externally located from the device 122 such as in or on a vehicle.

At act A305, the navigation device receives the route. The route may be generated from a link node routing graph including one or more center segments and one or more destination segments. The one or more center segments and one or more destination segments are calculating using a straight skeleton algorithm on a polygon with a one or more destinations. The route may be generated using an algorithm such as Dijkstras or another shortest path algorithm. The route may include sections from a roadway map and portions generated using the straight skeleton algorithm. A section from the roadway map may connect to the portion using the straight skeleton algorithm though one or more destination points. The navigation device 122 may also receive the link node routing graph. The link node routing graph may include attributes for each link and node. The link node routing graph may be stored locally in the memory 204 of the navigation device.

Figure 20:
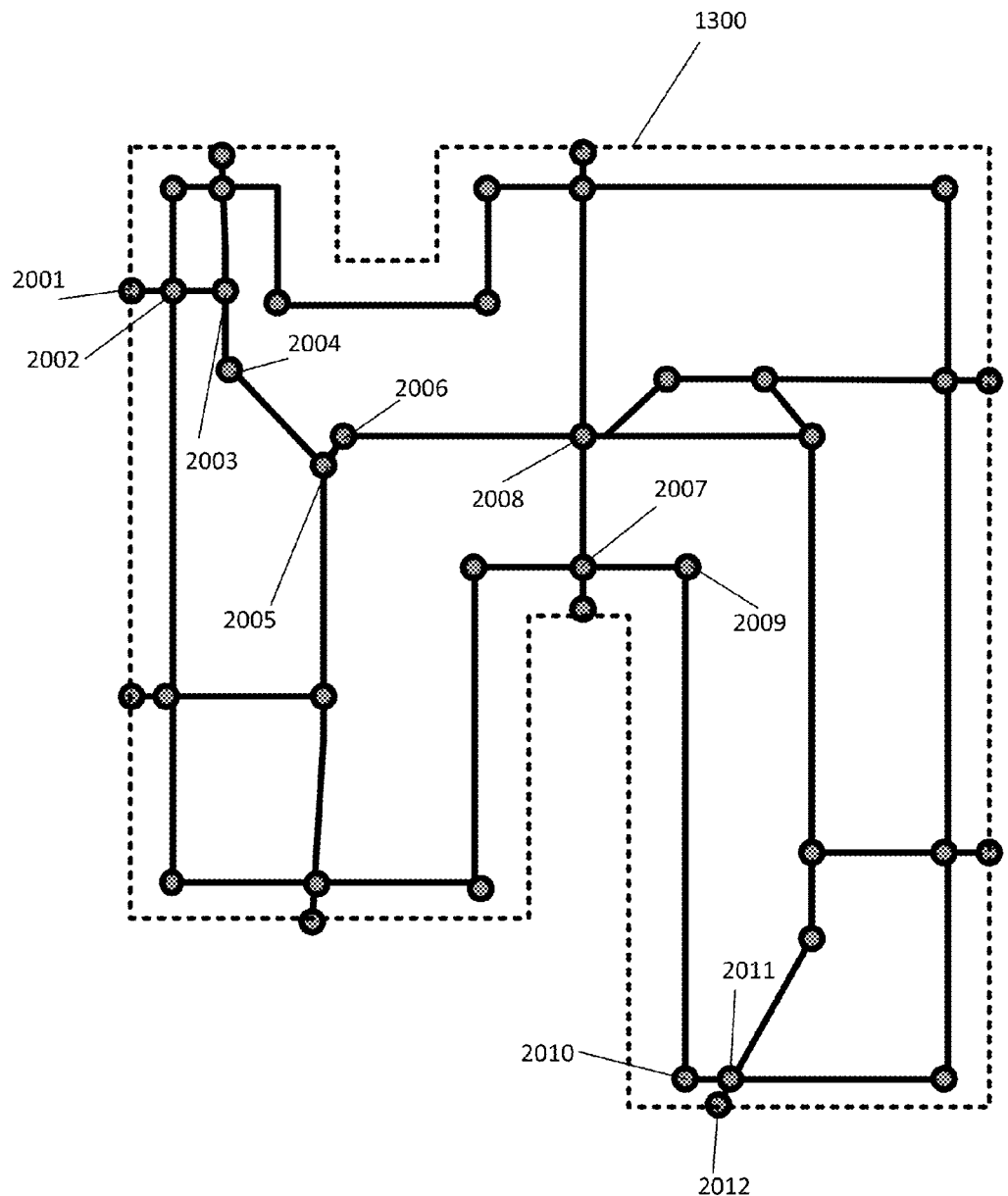
FIG. 20 illustrates a route from the example link node routing graph of FIG. 17.
Figure 21:
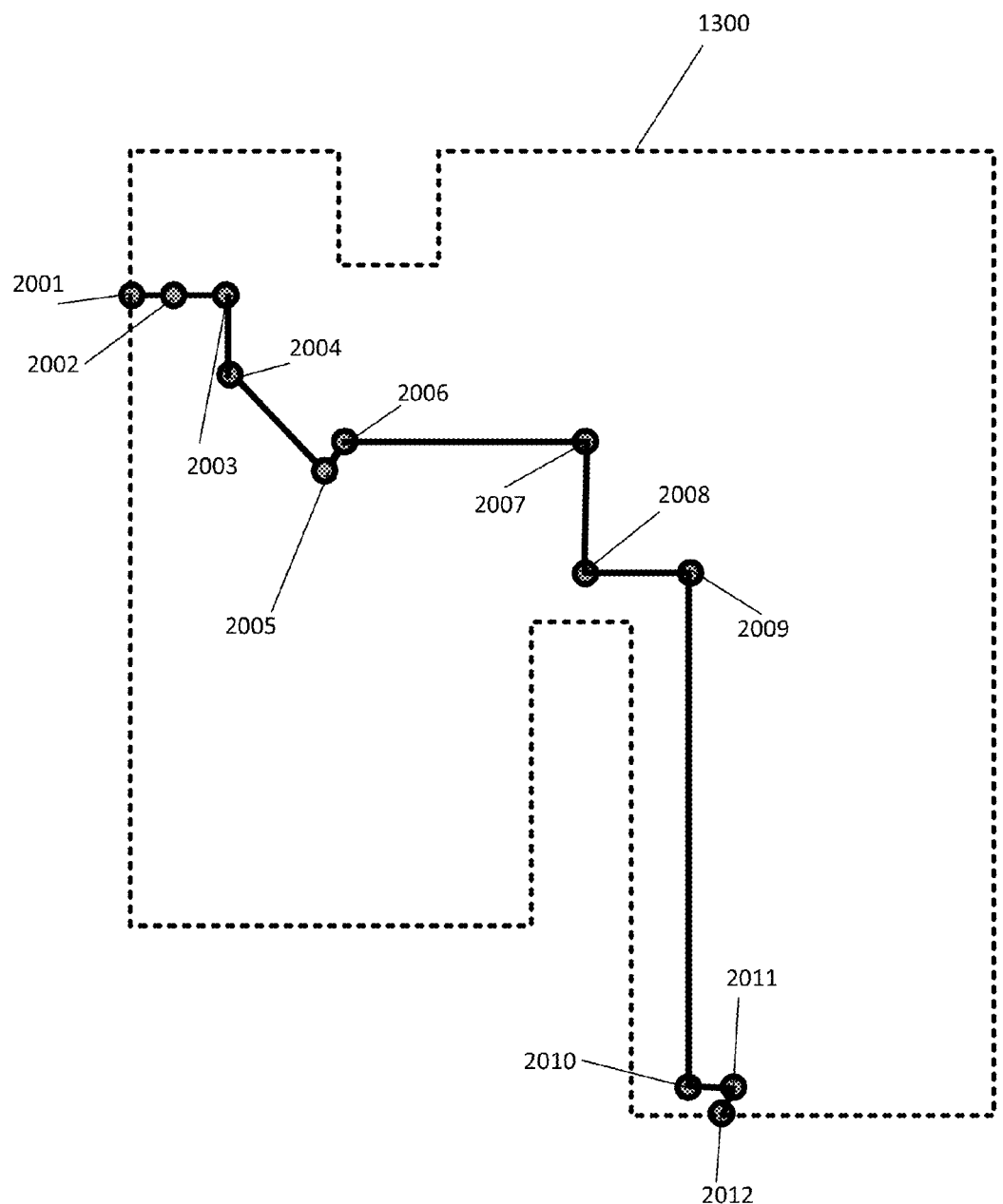
FIG. 21 illustrates a route from the example link node routing graph of FIG. 17.

FIGS. 20 and 21 illustrates an example of a route from destination 2001 to destination 2012. FIG. 20 illustrates the full link node routing graph. FIG. 21 illustrates a route to go from destination 2001 to destination 2012. The route includes nodes 2001, 2002, 2003, 2004, 2005, 2006, 2007, 2008, 2009, 2020, 2011, and 2012. The route starts at destination point 2001. The route then travels along a link from node 2001 to 2002 and then to 2003. These links were generated by a destination segment. Next the route travels to link 2004, 2005, 2006, and 2008 along center segments. The next link between 2007 and 2008 is part of a destination segment. The next links are made up the intermediary polygon segments including the links between nodes 2008, 2009, 2010, and 2011. Finally the route travels from 2011 to 2012 on a destination segment.

A route that only included center segments would end up continuing straight at node 2007 and add additional distance to the route. Taking a right at node 2007 cuts distance and time off the route. By using intermediary segments like the ones between nodes 2009 and 2010, the route is better able to mimic a natural walking pattern.

The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored map database or link node routing graph. The locally stored map database may be a copy of the map database or may comprise a smaller piece. The locally stored map database may use the same formatting and scheme as the map database.

The navigation device may determine a route or path from a received or locally stored link node routing graph using the controller 200. The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing. The controller 200 may also include a decoder used to decode roadway messages and roadway locations.

The link node routing graph for the navigable space may be used to directly or indirectly navigate a vehicle. The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the link and node information provided to the navigation device 122.

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying, by a processor, a pedestrian space;
   generating, by the processor, a polygon from the pedestrian space;
   calculating, by the processor, skeleton lines for the polygon, wherein the skeleton lines for the polygon are generated through a translation of lines of the polygon inward using a predefined offset value;
   establishing nodes of the skeleton lines;
   removing, by the processor, a subset of skeleton lines leaving one or more center segments;
   generating, by the processor, a link node routing graph including the one or more center segments for the pedestrian space and one or more established nodes of the skeleton lines; and
   transmitting the link node routing graph to a personal navigation device.

2. The method of claim 1, further comprising:
   reducing, by the processor, the one or more center segments by removing a subset of the center segments which are similar to an adjacent center segment.

3. The method of claim 1, further comprising:
   removing, by the processor, an area representing at least one obstacle from the polygon.

4. The method of claim 1, wherein the pedestrian space includes multiple polygons, wherein the one or more center segments from each of the multiple polygons are combined to generate the link node routing graph.

5. The method of claim 1, wherein the pedestrian space is an indoor space.

6. The method of claim 1 further comprising:
   identifying, by the processor, one or more destinations points on the polygon; and
   generating, by the processor, one or more destination segments by connecting the one or more center segments to the one or more destination points, wherein the link node routing graph further includes the one or more destination points and one or more destination segments.

7. The method of claim 6, further comprising:
   identifying, by the processor, an intermediary polygon a first offset distance from the polygon, wherein the intermediary polygon includes intermediary segments; and
   generating, by the processor, one or more perimeter segments from the intermediary polygon to the one or more destination points, wherein the link node routing graph further includes the perimeter segments and the intermediary segments.

8. The method of claim 6, further comprising:
   generating, by the processor, a shortest path between a starting location and one or more destinations points using the link node routing graph.

9. The method of claim 6, wherein the one or more destination segments are generally perpendicular to the one or more center segments.

10. The method of claim 6, wherein the pedestrian space includes multiple floors, wherein each polygon is a different floor, wherein the multiple floors are connected by one or more destination points.

11. The method of claim 6, wherein the one or more center segments or one or more destination segments are one directional.

12. The method of claim 6, wherein the one or more destination points, one or more destination segments, or one or more center segments include attributes.

13. The method of claim 12, wherein the attributes include type of flooring, grade, accessibility, or combination thereof.

14. An apparatus comprising:
   at least one processor; and
   at least one memory including computer program code for one or more programs; the at least one memory configured to store the computer program code configured to, with the at least one processor, cause the apparatus to at least perform:
   identifying a navigable space;
   generating a polygon from the navigable space;
   calculating straight skeleton lines for the polygon, wherein the skeleton lines for the polygon are generated through a translation of lines of the polygon inward using a predefined offset value;
   establishing nodes of the skeleton lines;
   removing a subset of straight skeletons lines to generate one or more center segments;
   identifying an intermediary polygon a first offset distance from the polygon, wherein the intermediary polygon includes intermediary segments;
   identifying one or more destination points in the navigation space;
   generating one or more destination segments from one or more center segments connected to the one or more destination points;
   generating one or more perimeter segments from the intermediary polygon to the one or more destination points;

generating a link node routing graph for the navigation space including the one or more center segments, the one or more intermediary segments, the one or more destination segments, and the one or more perimeter segments; and transmitting the link node routing graph to a personal navigation device.

15. The apparatus of claim 14, wherein the at least one memory and computer program code are configured to cause the apparatus to further perform:

transmitting the link node routing graph to a personal navigational device.

16. The apparatus of claim 14, wherein the one or more center segments, the one or more intermediary segments, the one or more destination segments, or the one or more perimeter segments include attributes.

17. The apparatus of claim 16, wherein the attributes include a type of flooring, grade, accessibility, or combination thereof.

18. The apparatus of claim 16, wherein the attributes include travel time for each segment.

19. An apparatus comprising:

at least one processor; and at least one memory including computer program code for one or more programs; the at least one memory configured to store the computer program code configured to, with the at least one processor, cause the apparatus to at least perform:

identifying a starting location and a destination;

transmitting a request for a route from the starting location to the destination;

receiving the route, wherein the route is generated from a link node routing graph including one or more center segments and one or more destination segments, wherein the one or more center segments and one or more destination segments are calculating using a straight skeleton algorithm on a polygon with a one or more destinations, wherein the skeleton lines for the polygon are generated through a translation of lines of the polygon inward using a predefined offset value; and transmitting the link node routing graph to a personal navigation device.

20. The apparatus of claim 19, wherein the route further includes segments from a roadway network.

* * * * *